US008391619B2

(12) United States Patent
Kawata et al.

(10) Patent No.: US 8,391,619 B2
(45) Date of Patent: Mar. 5, 2013

(54) STRUCTURE DETERMINATION SYSTEM, STRUCTURE DETERMINATION METHOD, AND PROGRAM

(75) Inventors: Masaaki Kawata, Ibaraki (JP); Chikara Sato, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 978 days.

(21) Appl. No.: 12/447,813

(22) PCT Filed: Oct. 5, 2007

(86) PCT No.: PCT/JP2007/069565
§ 371 (c)(1),
(2), (4) Date: Apr. 29, 2009

(87) PCT Pub. No.: WO2008/053667
PCT Pub. Date: May 8, 2008

(65) Prior Publication Data
US 2010/0067809 A1 Mar. 18, 2010

(30) Foreign Application Priority Data

Oct. 31, 2006 (JP) ................................ P2006-295595
Dec. 18, 2006 (JP) ................................ P2006-339812

(51) Int. Cl.
*G06K 9/62* (2006.01)
(52) U.S. Cl. ........ 382/224; 382/305; 382/242; 358/1.16
(58) Field of Classification Search .................. 382/274, 382/218, 199, 176, 165
See application file for complete search history.

(56) References Cited

U.S. PATENT DOCUMENTS 5,844,718 A * 12/1998 Ohsawa et al. ............... 358/539
5,881,171 A * 3/1999 Kinjo ............................ 382/199
(Continued)

FOREIGN PATENT DOCUMENTS

JP        8-292164 A     11/1996
JP     2004-038362 A      2/2004
(Continued)

OTHER PUBLICATIONS

Sato et al., "3D structure map of the voltage sensitive sodium channel" AIST TODAY, vol. 1, (2001), pp. 9-14.
(Continued)

*Primary Examiner* — Vu Le
*Assistant Examiner* — Aklilu Woldemariam
(74) *Attorney, Agent, or Firm* — Birch, Stewart, Kolasch & Birch, LLP

(57) ABSTRACT

Resolution of structural analysis using image data is improved. A method is provided including the steps of: acquiring data representing measured images and data representing a predetermined number of reference images (S103); generating data representing groups of derived images by changing a relative position of each of the measured images, evaluating similarity between the derived images and the reference images for each group of the derived images, and extracting a plurality of derived images highly similar to any one of the reference images, from each of the groups of the derived images (S105); classifying the extracted derived images into a plurality of groups on the basis of a spatial arrangement of the derived images, averaging the derived images classified into a common group to generate data representing a plurality of averaged images (S107); and determining a structure of a measurement object based on data representing the averaged images (S115).

18 Claims, 17 Drawing Sheets

U.S. PATENT DOCUMENTS

| | | | | |
|---|---|---|---|---|
| 6,084,989 | A | * | 7/2000 | Eppler .................. 382/293 |
| 6,674,905 | B1 | * | 1/2004 | Matsugu et al. ............. 382/199 |
| 6,700,679 | B1 | * | 3/2004 | Fujita et al. .................. 358/1.9 |
| 6,757,444 | B2 | * | 6/2004 | Matsugu et al. ............. 382/283 |
| 6,798,906 | B1 | * | 9/2004 | Kato .......................... 382/176 |
| 7,330,600 | B2 | * | 2/2008 | Nishida ...................... 382/274 |
| 2002/0176622 | A1 | * | 11/2002 | Watanabe et al. ............ 382/165 |
| 2003/0099397 | A1 | * | 5/2003 | Matsugu et al. ............. 382/173 |
| 2004/0076337 | A1 | * | 4/2004 | Nishida ....................... 382/274 |
| 2004/0114806 | A1 | | 6/2004 | Katayama et al. |

FOREIGN PATENT DOCUMENTS

| | | |
|---|---|---|
| JP | 2005-122284 A | 5/2005 |
| JP | 2006-202115 A | 8/2006 |
| JP | 2007-41738 A | 2/2007 |
| WO | WO-02/075658 A1 | 9/2002 |

OTHER PUBLICATIONS

Ueno et al., "Three-dimensional reconstruction of single particle electron microscopy: the voltage sensitive sodium channel structure", Science Progress, vol. 84, No. 4, 2001, pp. 291-309.

Sato at al., "Three Dimensional Structure of Sodium Channel : Structure Determination by Single Particle Reconstruction" Biophysics, vol. 42, No. 1, Feb. 2002, pp. 24-27.

Ueno et al., "Single Particle Analysis of Proteins by Electron Microscopy Yutaka", Journal of the Physical Society of Japan, vol. 57, No. 8, 2002, pp. 568-574.

Sato et al., "Protein structural analysis not using crystal by single particle analysis: Case of structure of voltage dependent Na+ channel" Electron Microscope, vol. 37, No. 1, 2002, pp. 40-44.

Frank, "Three-Dimensional Electron Microscopy of Macromolecular Assemblies", Oxford University Press, 2006, pp. 122-123 and pp. 192-276.

* cited by examiner

Fig.6

| MEASURED IMAGES | i-1 | ROTATION ANGLE θ FOR DERIVED IMAGE GROUPS | | | | | | | |
|---|---|---|---|---|---|---|---|---|---|
| | | 0 | θ1 | θ2 | θ3 | θ4 | θ5 | ··· | θq |
| REFERENCE IMAGES | r-1 | | PEAK I1 | | | PEAK I3 | | | |
| | r-2 | | | | | | | | |
| | r-3 | | | PEAK I2 | | | | | |
| | ⋮ | | | | | | | | |
| | r-m | | | | | | | | |

DERIVED IMAGES THAT ARE HIGHLY SIMILAR
TO REFERENCE IMAGES ARE EXTRACTED

Fig.8
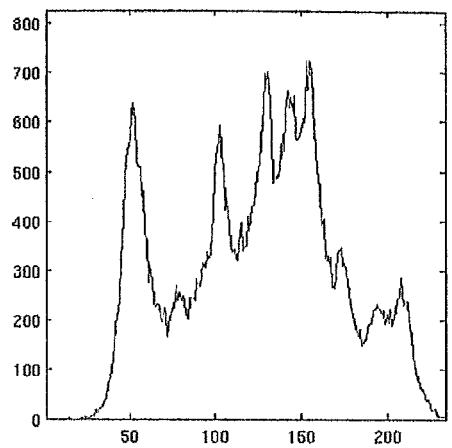
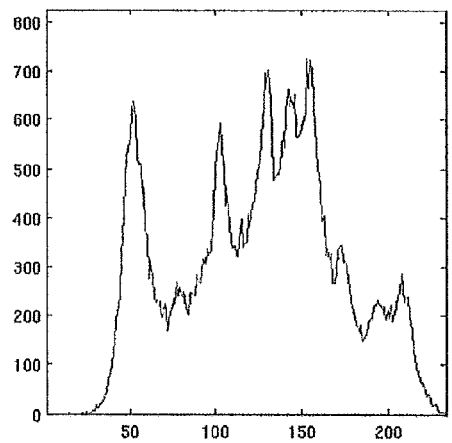

Fig.14

| SNR | IMAGE GROUP | COMPARATIVE EXAMPLE 1 MRA/MSA/HAC METHOD | EXAMPLE 1 MRMA/MSA/HAC METHOD |
|---|---|---|---|
| 0.005 | (a) | 0.00040077 | 0.00019491 |
|  | (b) | 0.00040409 | 0.00019394 |
|  | (c) | 0.00040211 | 0.00019660 |
| 0.01 | (a) | 0.00036215 | 0.00017398 |
|  | (b) | 0.00036131 | 0.00017783 |
|  | (c) | 0.00035687 | 0.00017349 |
| 0.05 | (a) | 0.00031509 | 0.00017448 |
|  | (b) | 0.00031164 | 0.00018075 |
|  | (c) | 0.00031499 | 0.00017047 |
| 0.10 | (a) | 0.00030236 | 0.00025423 |
|  | (b) | 0.00030619 | 0.00024106 |
|  | (c) | 0.00029052 | 0.00027095 |

Fig.15

|  | COMPARATIVE EXAMPLE 2<br>MRA/MSA/HAC<br>METHOD | EXAMPLE 2<br>MRMA/MSA/HAC<br>METHOD |
|---|---|---|
| Transient receptor protein 3 | 0.094703 | 0.067069 |
| VOLTAGE-DEPENDENT $NA^+$ CHANNEL | 0.104431 | 0.054251 |

STRUCTURE DETERMINATION SYSTEM, STRUCTURE DETERMINATION METHOD, AND PROGRAM

TECHNICAL FIELD

The present invention relates to a system, method and program for determining a structure of a subject of analysis based on image data.

BACKGROUND ART

A conventional technique of preparing, as a subject of analysis, a sample obtained by crystallizing biological macromolecules such as proteins, and analyzing and evaluating the sample using X-ray crystal structural analysis and NMR methods exists as a technique for analyzing the three-dimensional structure of molecules. This technique, however, requires crystallization of the sample, and cannot be applied to analysis of samples such as membrane proteins that are difficult to crystallize.

Single particle structural analysis has been proposed as a technique which requires no crystallization of the sample in which a structure of proteins is analyzed using a Cryo-Transmission Electron Microscope (TEM) (see Non-Patent Documents 1 and 2). Single particle structural analysis is a method for extracting sample images each representing a globular protein from a TEM image that is obtained from a globular protein sample cooled at a cryogenic temperature by a transmission electron microscope (TEM), and determining the three-dimensional structure of the globular protein sample based on the sample images. This technique reduces noise in the sample images by taking the average of the sample images.

One case of analyzing the three-dimensional structure of molecules is described above. Typically, image processing can be used for structural analysis of the subject of analysis.

Non-Patent Document 1: Sato Chikara, et al., "Protein Structural analysis not Using Crystal by Single Particle Analysis: Case of Structure of Voltage Dependent $Na^+$ Channel", Electron Microscope, 2002, Volume 37, No. 1, pp. 40 to 44.

Non-Patent Document 2: J. Frank, "Three-Dimensional Electron Microscopy of Macromolecular Assemblies", Oxford University Press, 2006, p. 122 and 193 to 276.

DISCLOSURE OF THE INVENTION

Problems to be Solved by the Invention

After studying conventional structural analysis using image processing in great detail, the present inventors concluded that there is considerable room for improvement in the resolution of structures obtained by analysis when using images substantially degraded by noise.

Specifically, in case of the single particle structural analysis described in the background art, when a subject of analysis is molecules such as membrane proteins that are easily oriented when preparing samples, it can be considered that the three-dimensional structure obtained by analysis could be obtained with a higher degree of resolution or in a more reliable manner.

A series of processes of analysis could be also be performed more rapidly and efficiently.

In view of the foregoing, an object of the present invention is to improve the resolution of structural analysis using image data.

Means for Solving the Problem

The present inventors have researched into improving the reliability of a structure obtained by structural analysis using image data. As a result, the present inventors have found that the resolution is significantly improved in data processing using measured images and reference images by generating a plurality of derived images obtained by changing a position of each measured image within a planar space, extracting, from the plurality of derived images, derived images which are highly similar to the reference images, and generating averaged images using the extracted derived images. The present inventors therefore conceived the present invention.

According to the present invention, there is provided a system which classifies data representing a plurality of measured images relating to a certain subject of analysis into a plurality of images and determines a structure of the subject of analysis based on the classification result. This system includes:

a reference image data storage unit which stores data representing a plurality of reference images;

a measured image classifying unit which generates data representing a plurality of groups of derived images being derived from the measured images by changing a relative position of each of the measured images with respect to the reference images, evaluates similarity between the derived images and the reference images for each of the plurality of groups of derived images, and extracts, from each of the groups of derived images, a plurality of derived images highly similar to any one of the plurality of reference images;

an averaged image data generating unit which classifies the plurality of derived images extracted by the measured image classifying unit into a plurality of groups, averages the derived images classified into a common group to generate data representing a plurality of averaged images, and determines whether updating of data representing the reference images is necessary, the averaged image data generating unit performing the updating of data representing the plurality of reference images in the reference image data storage unit using data representing the plurality of averaged images and sends a request causing the measured image classifying unit to perform processing for extracting the derived images when determining that the updating is necessary, and the averaged image data generating unit setting the generated data representing a plurality of averaged images as data to be used for structure determination when determining that the updating is not necessary; and a structure determining unit which acquires data representing the plurality of averaged images generated by the averaged image data generating unit and determines a structure of the subject of analysis based on the acquired data.

According to the present invention, there is also provided a method for classifying data representing a plurality of measured images relating to a certain subject of analysis into a plurality of images and for determining a structure of the subject of analysis based on the classification result. This method includes the steps of:

generating data representing a plurality of groups of derived images being derived from the measured images by changing a relative position of each of the measured images with respect to the reference images, evaluating similarity between the derived images and the reference images for each of the plurality of groups of derived images, and extracting, from each of the groups of derived images, a plurality of derived images highly similar to any one of the plurality of reference images;

classifying the plurality of derived images extracted in the step of extracting a plurality of derived images into a plurality of groups, averaging the derived images classified into a common group to generate data representing a plurality of averaged images;

determining whether updating of data representing the reference images is necessary;

when it is determined in the step of determining that the updating is necessary, performing the updating of data representing the plurality of reference images using new data representing the plurality of averaged images, and performing the preceding steps starting from the step of generating data representing a plurality of groups of derived images again; and when it is determined that the updating is not necessary, determining the structure of the subject of analysis based on data representing the plurality of averaged images.

In a conventional single particle structural analysis, each measured image is associated with each reference image which is selected, from among reference images, as an image having the highest similarity.

By contrast, according to the present invention, data representing a plurality of images relating to the certain subject of analysis is classified into a plurality of images. In the classification, for each of the measured images, a derived image group comprised of one or more derived images is generated. The derived images are obtained by changing a relative position of each of the measured images with respect to the reference image. A plurality of derived images which are highly similar to each reference image is extracted from the derived image groups for each measured image. The extraction of the plurality of derived images from the derived image group corresponding to one measured image enables a plurality of derived images to be extracted as candidates from the derived image group, when there are the candidates of derived images which are estimated to be highly similar to the reference image existing in the derived image group for one measured image. These candidates can be used for averaging processing. Even when noise in the measured image is large, failure to extract candidates of the derived images that are estimated to be highly similar to the reference image is prevented. Therefore, compared to the conventional single particle structural analysis described above, the resolution of data representing the averaged images and/or the reliability of the structure determined based on data representing a plurality of averaged images is significantly improved.

A type of the structure to be determined according to the present invention is not particularly limited. The type can be a two-dimensional structure, for example, or a three-dimensional structure. Also, data representing a plurality of two-dimensional structures obtained by analysis can be used for determination of a three-dimensional structure.

According to the present invention, data representing the measured images is not limited to raw data obtained by predetermined measurement. The data representing the measured images can be data obtained by applying predetermined conversion processing on the raw data. For example, the structure determination technique according to the present invention can be applied to data obtained by applying transformation processing such as filtering processing or Radon processing on data representing the measured images.

According to the present invention, when it is determined that the updating of data representing the reference image is necessary, similarity between the updated data representing the reference images and the derived images is evaluated again to extract a plurality of derived images. The reference images can be updated to reflect the averaged images if necessary. This improves the quality of the reference images. Derived images that are highly similar to new reference images can be extracted. Averaged images are newly generated using the newly extracted derived images, and the structure of the subject of analysis is determined using the data. This enables further improvement in the resolution of each of averaged images and in the reliability of the determined structure.

According to the present invention, reference image searching processing for one time and subsequent averaged image generation processing are complicated. Nevertheless, compared to the conventional single particle analysis, the number of times the updating is performed is reduced, and the reliability or resolution of the finally obtained structure can be improved after the updating.

According to the present invention, the number of the reference images before the updating can be equal to or different from the number of the reference images after the updating.

According to the present invention, molecules can be used as the subject of analysis for example. Also, the measured images can be obtained from an electron micrograph representing the molecules.

In case of analyzing a molecule structure using an electron microscope, when the intensity of an electron beam irradiated to molecules is too strong, the molecule structure can be degraded. On the other hand, when the intensity of an electron beam irradiated to molecules is too weak, an S/N ratio of an obtained image may deteriorate. Therefore, in structural analysis of molecules using the electron microscope, there is a trade-off relationship between preservation of the molecule structure and the S/N ratio.

According to the present invention, even when the measured images with low S/N ratios are used, structural analysis can be performed with high reliability, and thus the measured images can be obtained while maintaining the molecule structure in an original state, and the reliability of the three-dimensional structure can be improved. Specifically, even when the S/N ratios of the measured images are equal to or less than 0.1, S/N ratios of the averaged images can be improved to the extent that the structural analysis can be sufficiently performed.

Here, the S/N ratio of the measured image is defined as a ratio between a signal distribution and a noise distribution as stated on page 122 of Non-Patent Document 2.

According to the present invention, when performing the structure determination using the averaged images, data representing the averaged images can be used without modification. Alternatively, predetermined processing such as contour extraction processing can be performed on data representing the averaged images before the structure determination.

According to the present invention, biological macromolecules can be used as the molecules. Membrane proteins can be the biological macromolecules. In this case, since the three-dimensional structure can be determined without crystallization of the membrane proteins, the three-dimensional structure of the membrane proteins that are typically difficult to crystallize can be reliably determined.

The membrane proteins are easily oriented in a specific direction when preparing of a sample for acquiring data representing the measured images. This increases the likelihood of a projected image (a characteristic view) for a specific direction not appearing among the measured images. Even for such a sample, the derived images that are highly similar to the reference images can be searched for and extracted.

High quality can therefore be achieved for the averaged images and the three-dimensional structure can be determined from the averaged images to a high degree of reliability.

According to the present invention, there is also provided a system which classifies a plurality of measured images relating to a membrane protein into a plurality of images and determines a structure of the membrane protein based on the classification result. This system includes:
- a reference image data storage unit which stores data representing a plurality of reference images;
- a measured image classifying unit which generates data representing a plurality of groups of derived images being derived from the measured images by changing a relative position of each of the measured images with respect to the reference images, evaluates similarity between the derived images and the reference images for each of the plurality of groups of derived images, and extracts, from each of the groups of derived images, a plurality of derived images highly similar to any one of the plurality of reference images;
- an averaged image data generating unit which classifies the plurality of derived images extracted by the measured image classifying unit into a plurality of groups, averages the derived images classified into a common group to generate data representing a plurality of averaged images, and determines whether updating of data representing the reference images is to be performed, the averaged image data generating unit performing the updating of data representing the plurality of reference images in the reference image data storage unit using data representing the plurality of averaged images and sending a request causing the measured image classifying unit to perform processing for extracting the derived images when determining that the updating is necessary, and the averaged image data generating unit setting the generated data representing a plurality of averaged images as data to be used for structure determination when determining that the updating is not necessary; and
- a structure determining unit which acquires data representing the plurality of averaged images generated by the averaged image data generating unit and determines a structure of the subject of analysis based on the acquired data, wherein:
- the number of pixels of each of the derived images and the reference images is n×m (where n and m are natural numbers);
- on the basis of indexes which represent respective distances between the derived images and the reference images in an n×m-dimensional image space, the measured image classifying unit is configured to search for a derived image which corresponds to a maximum peak of the indexes, as one of the plurality of derived images which is most similar to any one of the plurality of reference images, and for one or more derived images each corresponding to a difference $\Delta$ of a peak of the indexes representing the distances, the difference $\Delta$ being within a certain range;
- the averaged image data generating unit classifies the plurality of derived images based on positional proximity among the plurality of derived images in an n×m-dimensional image space or an L-dimensional pixel space, and further updates data representing the plurality of reference images in the reference image data storage unit using data representing the plurality of averaged images and sends a request causing the measured image classifying unit to perform processing for extracting the derived images;
- the measured image classifying unit receives the request, evaluates similarity between the derived images and the updated reference images, and extracts, from each of the groups of derived images, a plurality of derived images highly similar to any one of the updated reference images;
- the averaged image data generating unit classifies the plurality of derived images newly extracted by the measured image classifying unit into a plurality of groups on the basis of positional proximity among the plurality of derived images in the L-dimensional pixel space, averages the newly extracted derived images classified into a common group to update data representing the plurality of averaged images, and determines whether updating of data representing the reference images is necessary, wherein, when determining that the updating is necessary, the averaged image data generating unit updates data representing the plurality of reference images in the reference image data storage unit using data representing the plurality of averaged images again and sends a request causing the measured image classifying unit to perform processing for extracting the derived images, and when determining that the updating is not necessary, the averaged image data generating unit provides the generated data representing the plurality of averaged images to the structure determining unit; and
- the structure determining unit acquires data representing the plurality of averaged images generated by the averaged image data generating unit and determines a structure of the membrane protein based on the acquired data.

According to the above-described configuration, the three-dimensional structure of the membrane protein molecules can be analyzed for a short time and with high reliability.

Arbitrary combinations of the above-described constituent elements can be effective as aspects of the present invention, and an embodiment obtained by converting between a method, an apparatus, a system, a recording medium, a computer program and so forth are also effective as one aspect of the present invention.

For example, according to the present invention, there is provided a program which causes a computer to function as a structure determination system which classifies data representing a plurality of measured images relating to a certain subject of analysis into a plurality of images and determines a structure of the subject of analysis based on the classification result. This structure determination system includes:
- a reference image data storage unit which stores data representing a plurality of reference images;
- a measured image classifying unit which generates data representing a plurality of groups of derived images being derived from the measured images by changing a relative position of each of the measured images with respect to the reference images, evaluates similarity between the derived images and the reference images for each of the plurality of groups of derived images, and extracts, from each of the groups of derived images, a plurality of derived images highly similar to any one of the plurality of reference images;
- an averaged image data generating unit which classifies the plurality of derived images extracted by the measured image classifying unit into a plurality of groups, averages the derived images classified into a common group to generate data representing a plurality of averaged images, and determines whether updating of data representing the reference images is necessary, the averaged image data generating unit performing the updating of data representing the plurality of reference images in the reference image data storage unit using data representing the plurality of averaged images and sending a request causing the measured image classifying unit to perform processing for extracting the derived images when determining that the updating is necessary, and the averaged image data generating unit setting the generated data representing a plurality of averaged images as data to be used for structure determination when determining that the updating is not necessary; and a structure determining unit which acquires data representing the plurality of averaged images generated by the averaged image data generating unit and determines a structure of the subject of analysis based on the acquired data.

Effect of the Invention

According to the present invention, data representing derived image groups which include a plurality of derived images obtained by changing a relative position to each reference image is generated for each of a plurality of measured images. Derived images that are highly similar to reference images are extracted from the derived image group for each measured image so as to improve the resolution of structural analysis using image data.

BRIEF DESCRIPTION OF THE DRAWINGS

FIG. 6 is a view illustrating a method for classifying measured images according to an embodiment;

FIG. 8 illustrates initial reference images according to an example;

FIG. 14 is a view illustrating processing results according to an example;

FIG. 15 is a view illustrating processing results according to an example;

EXPLANATION OF REFERENCE NUMERALS

Figure 1:
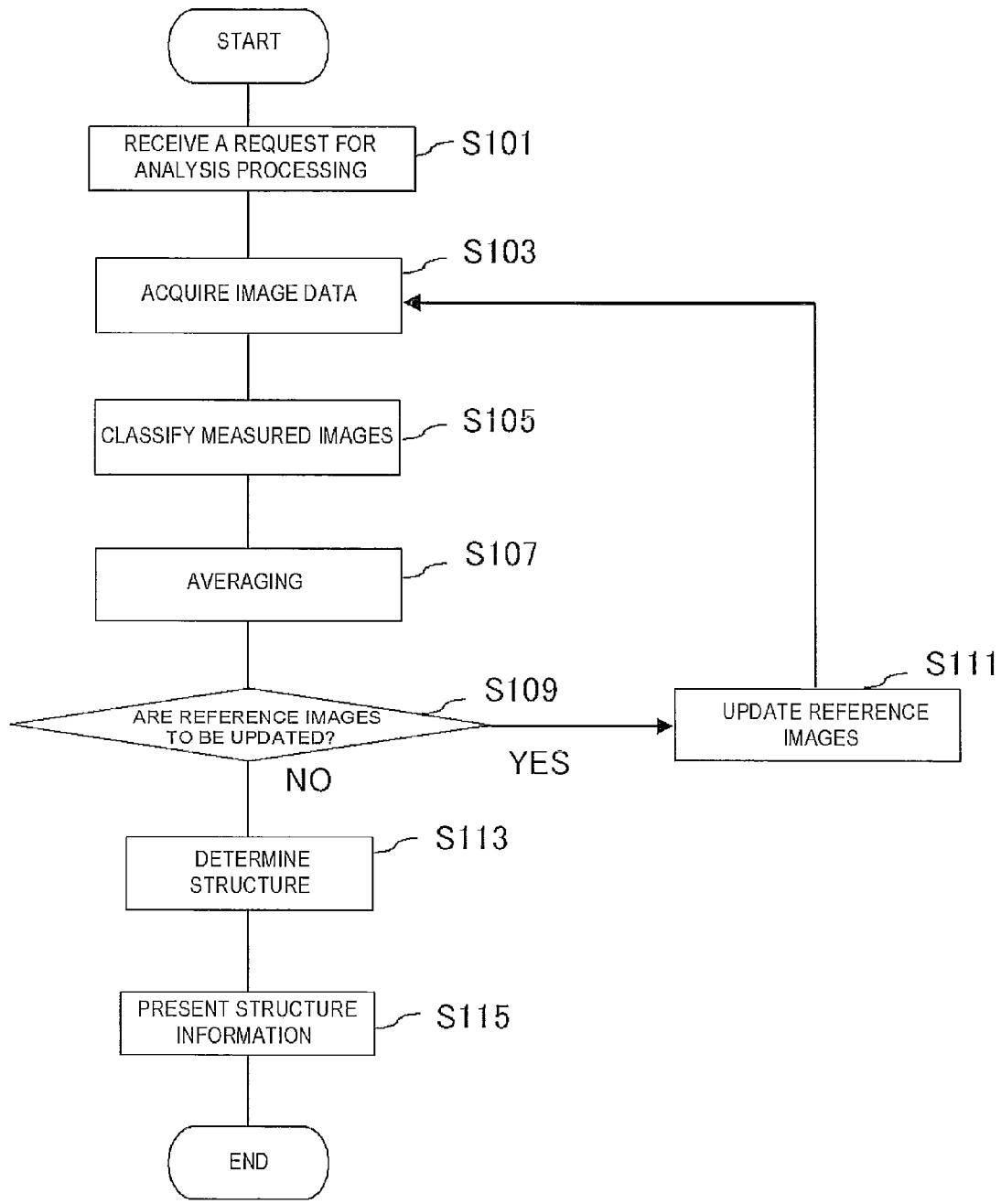
FIG. 1 is a flowchart illustrating a structure determination method of an embodiment.

100: STRUCTURE DETERMINATION SYSTEM
101: DATA PROCESSING UNIT
103: STORAGE UNIT
105: RECEIVING UNIT
107: IMAGE DATA ACQUIRING UNIT
109: MEASURED IMAGE DATA ACQUIRING UNIT
111: REFERENCE IMAGE DATA ACQUIRING UNIT
113: MEASURED IMAGE CLASSIFYING UNIT
115: AVERAGING PROCESSING UNIT
117: STRUCTURE DETERMINING UNIT
119: OUTPUT UNIT
121: MEASURED IMAGE DATA STORAGE UNIT
123: REFERENCE IMAGE DATA STORAGE UNIT
125: CLASSIFICATION INFORMATION STORAGE UNIT
127: AVERAGE INFORMATION STORAGE UNIT
129: OPERATION INFORMATION STORAGE UNIT
131: DERIVED IMAGE DATA GENERATING UNIT
133: SIMILARITY COMPUTING UNIT
135: CONDITION STORAGE UNIT
137: SEARCH RESULT STORAGE UNIT
139: CANDIDATE SEARCHING UNIT

BEST MODE FOR CARRYING OUT THE INVENTION

Embodiments of the present invention will be described below with reference to the accompanying drawings. In the drawings, similar parts are designated using the same reference numerals, and are not described twice.

In embodiments described below, the three-dimensional structure of the membrane protein is analyzed using single particle analysis, but a subject of analysis of the present invention is not limited to a biological macromolecule such as the membrane protein and can include a synthetic polymer or various low molecular compounds.

The present invention is not limited to a three-dimensional structural analysis of a molecule using single particle analysis or other image processing and can be used for determining the structure of a subject of analysis using an image. For example, the present invention can be used for analysis of a satellite image. The number of dimensions of a structure to be determined is not particularly limited. The structure to be determined can include, for example, a two-dimensional structure or a three-dimensional structure.

Figure 13:
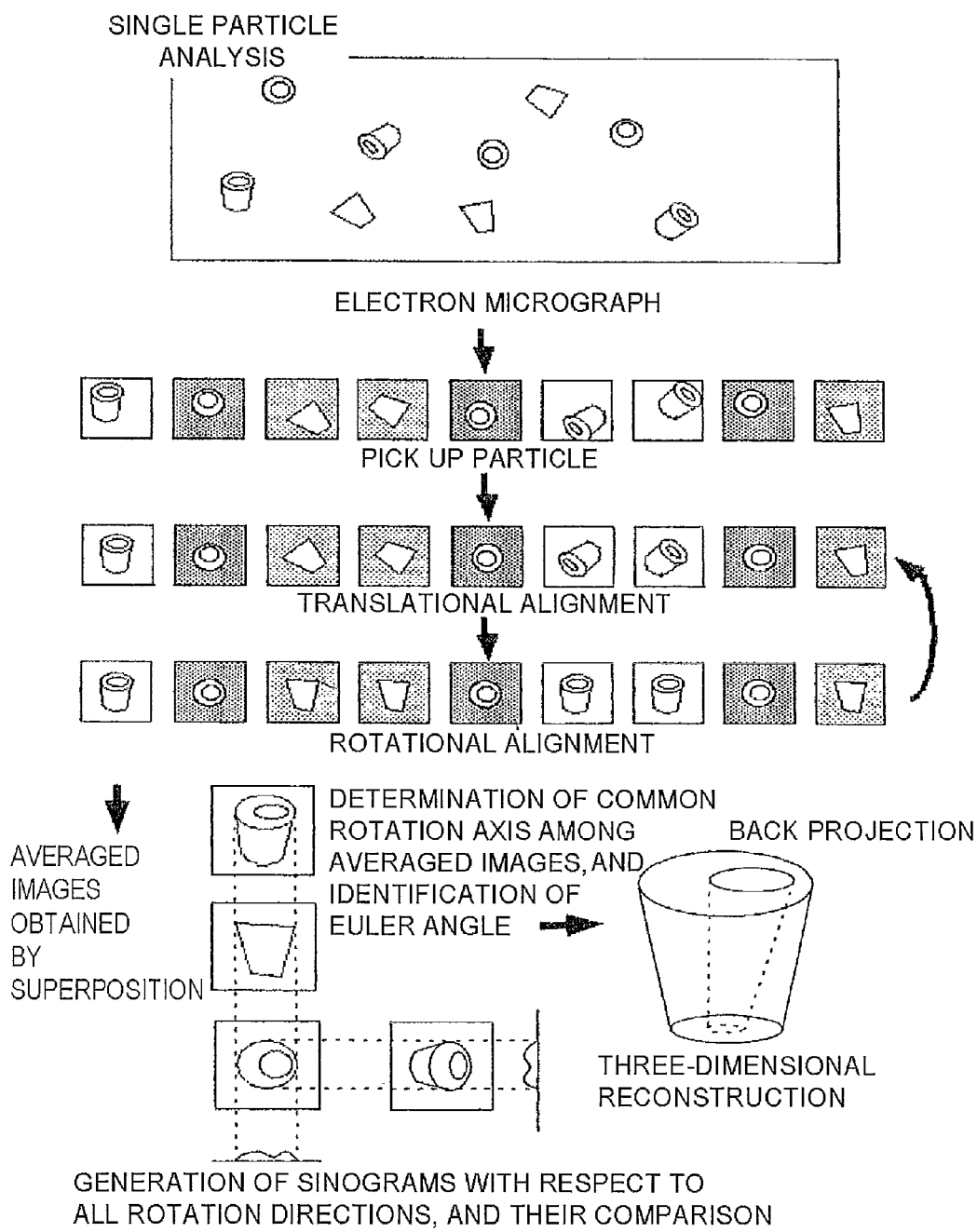
FIG. 13 is a view illustrating single particle analysis.

First, in order to facilitate understanding of the present invention, conventional single particle analysis is briefly described below with reference to FIG. 13 as an example of three-dimensional structural analysis of a molecule. FIG. 13 illustrates single particle analysis disclosed in Non-Patent Document 1 described in the background art. As described in the document, the single particle analysis is a protein structural analysis which does not use a crystal. In such single particle analysis, structural analysis is performed using an electron microscope image of proteins.

An electron microscope image of protein contains a lot of noise because the sample is damaged by irradiation with an electron beam. This limits resolution. A sample such as protein which is damaged easily by an electron beam does not result in an image exhibiting the actual resolution of the electron microscope because the signal-to-noise ratio (S/N ratio) is poor and image resolution is limited. This means that not only is high-resolution information not obtained from one image, but also it is not easy to reconstruct a three-dimensional structure.

In order to overcome the above problem, single particle analysis uses a computer-aided crystallization method in which particle images of the same orientation are selected and averaged. This improves both S/N ratio and resolution (center in FIG. 13). Since a non-dyed electron micrograph obtained by a freezing method is considered to give a projected image in which density within a molecule is reflected, sinograms one-dimensionally projected at various angles are prepared from an averaged image with an improved S/N ratio and are compared with each other, and three-dimensional angles against each other are estimated (lower left side in FIG. 13).

That is, components which are high in degree of coincidence are searched for by using sinograms one-dimensionally projected while changing an angle through 360 degrees. Images with similar particle projection directions are overlapped and averaged. Corresponding values are obtained for three or more averaged images, and a relative particle azimuth angle for each averaged image is estimated. Average projected images are then three-dimensionally combined to reconstruct a three-dimensional structure with a small amount of noise (lower right side in FIG. 13) based on the values. Since noise is random and does not occur at the same location, the S/N ratio is more improved by overlapping and averaging many images.

Also, a plurality of averaged images obtained is used again as reference images for alignment of the original image so as to create a newly improved averaged image. The S/N ratio is more improved further by repeating such a cycle a predetermined number of times.

Single particle analysis is performed in the above-describe procedure.

However, in such a method, an averaged image is generated in analysis by associating one measured image with one reference image. Therefore, if the S/N ratio of a measured image is small, even when the above-described cycle is repeated a predetermined number of times, the S/N ratio of an averaged image converges to a certain S/N ratio and thus cannot be improved any further.

In the present invention, for each of measured images, a derived image group of a measured image is generated for each of the measured images by changing a position of a measured image within a surface and changing its relative position to a reference image, and a plurality of derived images which are highly similar to any one of the reference images are extracted from one derived image group. A plurality of derived images extracted from one derived image group of a plurality of measured images are clustered into groups, and a plurality of derived images which belong to the same group are averaged to generate an averaged image. The S/N ratio and a resolution can therefore be improved as a result.

A specific method will be described.

FIG. 1 is a flowchart illustrating a procedure for determining a structure according to this embodiment.

FIG. 1 illustrates a procedure for classifying data representing a plurality of images relating to a certain molecule (i.e., a membrane protein) into a plurality of images and determining a three-dimensional structure of the membrane protein based on the classification result. The procedure is roughly divided into four processes:
(1) Receiving a structural analysis request to classifying measured images;
(2) Generating an averaged image;
(3) Updating data representing reference images and repeating;
(4) Determining a structure.

The above processes include the following steps.
(1) Receiving a Structural Analysis Request to Classify Measured Images
  Step S101: an analysis processing request is received,
  Step S103: data representing a measured image and data representing a predetermined number of reference images are acquired; and Step S105: for each of a plurality of measured images, data representing a derived image group of a measured image in which a relative position to a reference image is changed is generated, and similarity between a derived image and a reference image is evaluated for each of a plurality of derived image groups generated, and a plurality of derived images which are highly similar to any one of a plurality of reference images is extracted from each derived image group.
(2) Generating Averaged Images
  Step S107: a plurality of derived images extracted from derived image groups of a plurality of measured images are classified into a plurality of groups, and derived images classified into the same group are averaged. This creates data representing a plurality of averaged images, and
  Step S109: it is determined whether updating of reference image data is necessary.
(3) Updating Reference Image Data and Repeating
  Step S111: when it is determined in step S109 that the updating is necessary (Yes in step S109), reference images are updated to reflect data representing the generated averaged images as new data representing reference images, and steps of and after the acquiring the updated data representing reference images (S103) onwards are repeated. An example for repeating the steps of step 103 onwards when it is determined that the updating is necessary is illustrated in FIG. 1.
(4) Determining a Structure
  Step S113: when it is determined that the updating is not necessary (NO in step S109), a three-dimensional structure of the membrane protein is determined based on data representing an averaged image, and
  Step S115: a three-dimensional structure determined in step S113 is suggested.

Next, a detailed configuration of an apparatus for performing the above-described procedure will be described.

Figure 2:
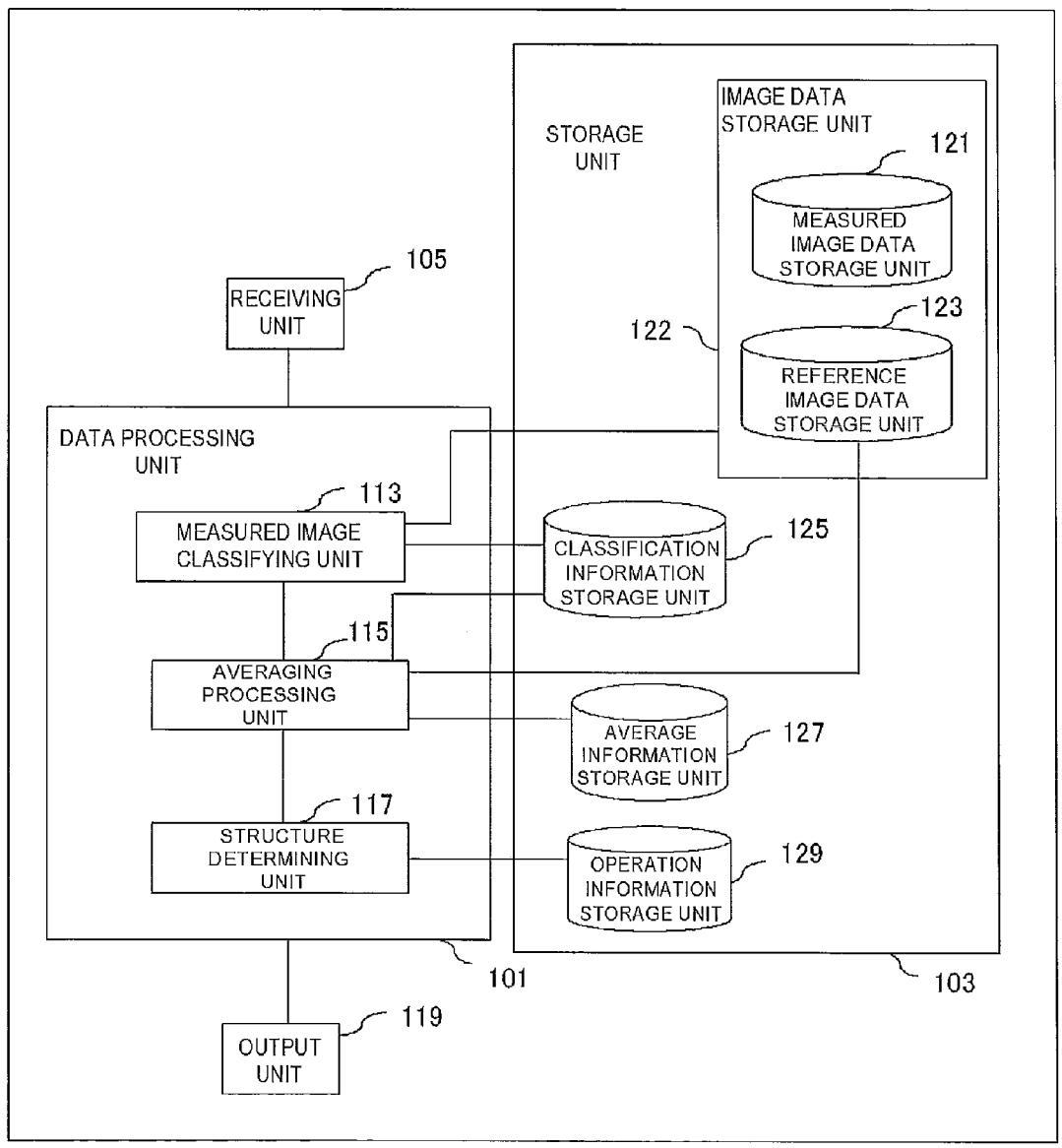
FIG. 2 is a view illustrating a schematic configuration of a structure determination system of an embodiment.

FIG. 2 is a view illustrating a basic configuration of a structure determination system according to this embodiment. A structure determination system 100 shown in FIG. 2 is a system which determines a structure of a subject of analysis from a plurality of images.

In this embodiment, a subject of analysis is a molecule such as a membrane protein. The structure determination system 100 reconstructs a three-dimensional structure of the membrane protein using a plurality of measured images of different observation directions.

When reconstructing a three-dimensional structure, a plurality of reference images which are smaller in number than measured images are used. Similarity to a reference image is evaluated while aligning with the reference image for a plurality of measured images. Specifically, a derived image group of a measured image in which a relative position to a reference image is changed is generated for each measured image, and similarity between each derived image and the reference image is evaluated. A plurality of derived images which are highly similar to the reference image is searched for from a derived image group derived from one measured image. A plurality of derived images extracted as the search result are classified into a plurality of groups, and a plurality of derived images classified into the same group are averaged to obtain an averaged image. The reference images are updated to reflect the obtained averaged images as new reference images. The accuracy of the reference image is then improved by repeating the processing for updating reference images to reflect the averaged images as new reference images. A three-dimensional structure of the membrane protein is reconstructed with high accuracy using the reference images which are updated a predetermined number of times.

The structure determination system 100 includes a receiving unit 105, a data processing unit 101, an output unit 119, and a storage unit 103.

The structure determination system 100 can have a configuration in which a plurality of terminals connected to each other via a network. In this case, each functional block or part thereof can be distributed across a plurality of terminals. The plurality of terminals can have the same functional blocks or share some of the functional blocks.

The receiving unit 105 receives, for example, a user's request (S101 of FIG. 1) and requests the data processing unit 101 to perform data processing.

The output unit 119 presents information of the determined structure of the membrane protein obtained by the data processing unit 101 to, for example, a user (S115 of FIG. 1).

The storage unit 103 stores data used for carrying out data processing at the data processing unit 101. As shown in FIG. 2, the storage unit 103 includes an image data storage unit 122 which includes a measured image data storage unit 121 and a reference image data storage unit 123, a classification information storage unit 125, an average information storage unit 127, and an operation information storage unit 129. The storage unit 103 and its configuration blocks can be distributed across a plurality of terminals.

Data representing a plurality of measured images for different directions of observing of the membrane protein which is a subject of analysis is stored in the measured image data storage unit 121. Specifically, measurement data representing TEM images of membrane proteins is stored. A cryo-TEM image and an image obtained by a negative dyeing analysis, for example, can be used as a TEM image. One measured image is a projected image of the membrane protein in a specific direction.

Data representing a plurality of reference images to be collated with derived images of a measured image is stored in the reference image data storage unit 123. When the reference images are updated (YES in step S109 of FIG. 1), the updated data representing reference images is stored in the reference image data storage unit 123.

Data such as an operational expression which the measured image classifying unit 113 uses to classify derived images for the measured image is stored in the classification information storage unit 125. Data related to the classification result, for example, data representing a derived image extracted as an image which is highly similar to a reference image, is stored.

Data related to an averaging processing method of the averaging processing unit 115 is stored in the average information storage unit 127. Information related to the number of update times can be stored in the average information storage unit 127. Information related to the number of update times is, for example, information in which an identifier which represents a sample type is associated with a required number of update times of a reference image.

An operational expression or data used when a structure determining unit 117 reconstructs a three-dimensional structure of a molecule which is a subject of analysis using a plurality of averaged images is stored in the operation information storage unit 129.

Next, a configuration for the data processing unit 101 will be described.

The data processing unit 101 performs processing which utilizes data representing measured images of membrane proteins. The data processing unit 101 includes a measured image classifying unit 113, an averaged image data generating unit (averaging processing unit 115), and a structure determining unit 117. The data processing unit 101 can be implemented using a plurality of data processing terminals.

Figure 3:
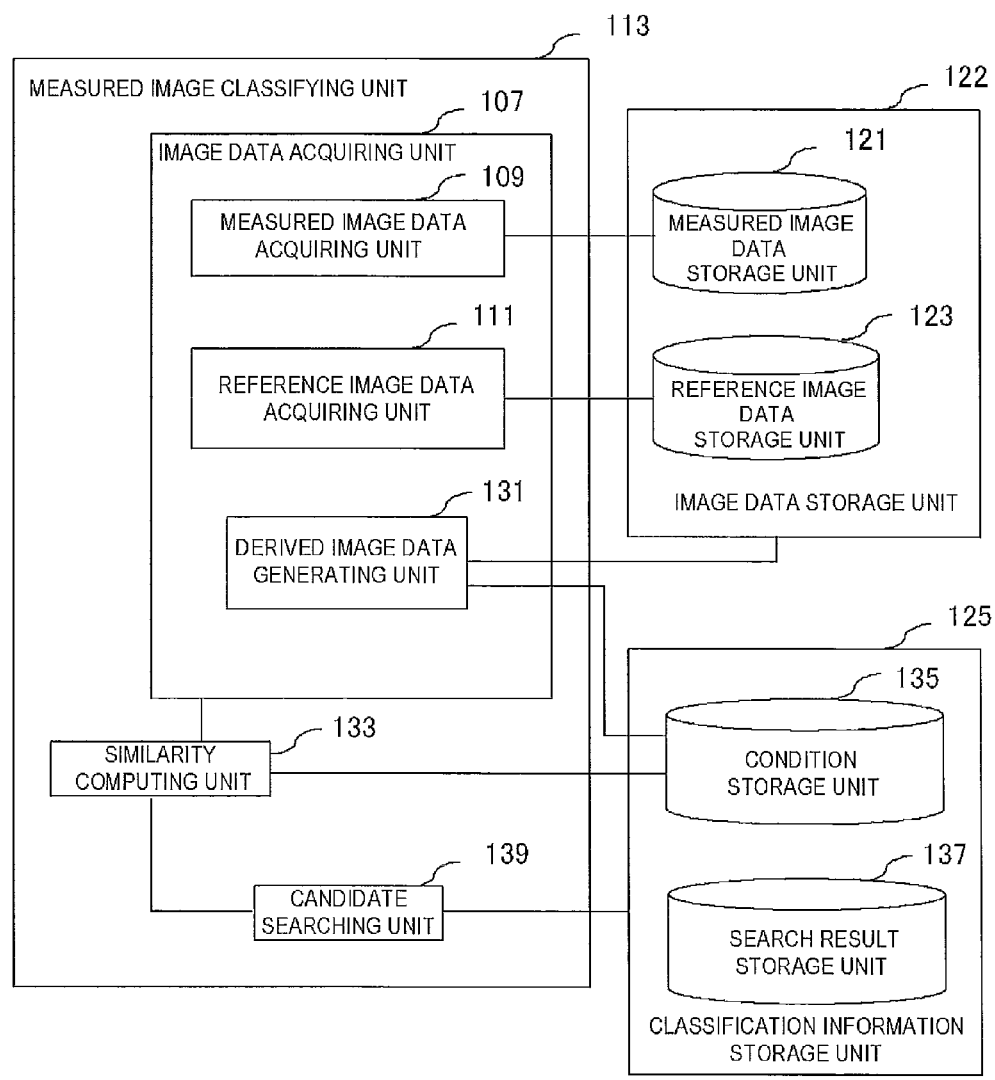
FIG. 3 is a view illustrating a detailed configuration of a measured image classifying unit of the structure determination system of FIG. 1.

FIG. 3 is a view illustrating a configuration for the measured image classifying unit 113 and cooperation between the measured image classifying unit 113 and the storage unit 103. The measured image classifying unit 113 will be described below with reference to FIGS. 2 and 3.

The measured image classifying unit 113 includes an image data acquiring unit 107, a similarity computing unit 133 and a candidate searching unit 139.

The image data acquiring unit 107 receives a request from the receiving unit 105, acquires data representing a plurality of measured images stored in the measured image data storage unit 121 and data representing a predetermined number of reference images stored in the reference image data storage unit 123, generates data representing a derived image group of a measured image, and transmits the generated data to the similarity computing unit 133 (S103 of FIG. 1).

The image data acquiring unit 107 includes a measured image data acquiring unit 109, a reference image data acquiring unit 111 and a derived image data generating unit 131.

The measured image data acquiring unit 109 acquires data representing a plurality of measured images stored in the measured image data storage unit 121 and transmits the data to the similarity computing unit 133.

The reference image data acquiring unit 111 acquires data representing a plurality of reference images stored in the reference image data storage unit 123 and transmits the data to the similarity computing unit 133. When data representing reference images stored in the reference image data storage unit 123 is updated, the reference image data acquiring unit 111 acquires the updated data representing images and transmits the acquired data to the similarity computing unit 133.

The derived image data generating unit 131 generates data representing a derived image of a measured image which is obtained by translating and rotating a measured image within a surface for each measured image, relates the generated data with an identifier of a measured image and transmits the related data to the similarity computing unit 133. A derived image is an image in which a relative position of a measured image to a reference image is changed by moving data representing the measured images in a planar space. The derived image data generating unit 131 generates data representing a plurality of derived images (derived image group) which are different in relative positions to a reference image from each measured image. The image data storage unit 122 can include a derived image data storage unit (not shown), and the derived image data generating unit 131 may relate the generated data representing a derived image with an identifier of a measured image and store the related data in the derived image data storage unit.

The similarity computing unit 133 acquires data representing a derived image group and data representing a plurality of reference images from the image data acquiring unit 107. The similarity computing unit 133 evaluates similarity between a derived image and a reference image, for a derived image group derived from each measured image, by referring to and using an operation parameter stored in a condition storage unit 135, and associates the evaluation result with an identifier of a derived image or a measured image from which a derived image originates and transmits the associated evaluation result to the candidate searching unit 139.

The candidate searching unit 139 acquires the similarity evaluation result computed by the similarity computing unit 133 and data on a search condition of a candidate image stored in the condition storage unit 135, searches for a derived image which is highly similar to a reference image, and extracts a plurality of derived images from one derived image group (S105 of FIG. 1). The search result is then transmitted to the search result storage unit 137. A method for searching a derived image which is highly similar to a reference image will be described later with reference to FIGS. 4 to 7.

The candidate searching unit 139 only has to extract a plurality of derived images from a derived image group of at least one measured image among a plurality of measured images of membrane proteins which is a subject of analysis, and therefore does not have to extract a plurality of derived images for derived images groups for all the measured images.

When reference images stored in the reference image data storage unit 123 is updated (S111 of FIG. 1), the measured image classifying unit 113 receives a request from the averaging processing unit 115, acquires the updated data representing reference images, extracts derived images as in step 105 for derived image groups and the updated reference images, and transmits the result to the search result storage unit 137.

Returning to FIG. 2, the averaging processing unit 115 acquires data representing a plurality of derived images extracted by the measured image classifying unit 113. The averaging processing unit 115 then clusters a plurality of derived images into a plurality of groups. For example, if the number of pixels is n×m (n and m are natural numbers) and the number of derived images is L (L is a natural number), derived images are grouped based on proximity among derived images in an n×m-dimensional image space or an L-dimensional pixel space.

The averaging processing unit 115 averages derived images belonging to a common group to generate data representing a plurality of averaged images. A method for computing an arithmetic average of data representing a plurality of derived images for each dot of an n×m matrix can be used as an averaging processing method, for example. Averaging processing may also include processing for removing noise. As processing for removing noise, for example, noise canceling in which noise is removed by approximately transforming noise into white noise can be used. An averaged image obtained accordingly corresponds to a projected image when viewing membrane proteins of a subject of analysis from one side.

The averaging processing unit 115 refers to data related to a determination criterion as to whether updating of the reference images stored in the average information storage unit 127 is necessary, and determines whether the updating of data representing the reference images is necessary (S109 of FIG. 1).

Whether the updating is necessary can be determined by comparing data representing an averaged image obtained with its corresponding data for one-cycle previous, and by determining whether it satisfies a predetermined improvement condition for the data for one-cycle previous, in a series of cycles which includes steps S103, S105, S107, S109, and S111. A parameter related to the quality of an image such as an improvement ratio of the S/N ratio or an improvement ratio of contour extraction can be used for the comparison. The averaging processing unit 115 can be configured to unconditionally update after a first cycle in which data for one-cycle previous does not exist.

When it is determined that the updating is necessary (YES in step S109 of FIG. 1), the averaging processing unit 115 updates data representing a plurality of reference images in the reference image data storage unit 123 using data representing a plurality of averaged images. The averaging processing unit 115 also requests the measured image classifying unit 113 to perform step S105 while updating data representing reference images. The averaging processing unit 115 also classifies a plurality of derived images generated by the measured image classifying unit 113 into a plurality of groups, averages a plurality of derived images classified into the same group, updates data representing averaged images, and determines whether updating of data representing reference images is necessary. When it is determined that the updating of data representing reference images is necessary, the averaging processing unit 115 transmits generated data representing a plurality of averaged images to the reference image data storage unit, updates data representing reference images again and requests the measured image classifying unit to perform the searching step of step S105. When it is determined that the updating is not necessary, the averaging processing unit 115 transmits the generated data representing a plurality of averaged images to the structure determining unit 117 as data used for structure determination.

On the other hand, when it is determined that the updating is not necessary (NO in step S109 of FIG. 1), the averaging processing unit 115 transmits the generated data representing a plurality of averaged images to the structure determining unit 117 as data used for structure determination.

The structure determining unit 117 acquires data representing a plurality of averaged images generated by the averaging processing unit 115 and determines a three-dimensional structure of the membrane protein based on the acquired data (S113 of FIG. 1). Specifically, the structure determining unit 117 determines a three-dimensional structure of the membrane protein by three-dimensionally reconstructing a plurality of projected images in which each averaged image is used as a projected image of the membrane protein in a specific direction, using a known method such as a method disclosed in Non-Patent Document in p. 122 and 193 to 276.

When reference images stored in the reference image data storage unit 123 are updated, the structure determining unit 117 acquires data representing a plurality of averaged images updated by the averaging processing unit 115 and determines a three-dimensional structure of the membrane protein based on the acquired data.

Next, how to classify measured images (S105 of FIG. 1) according to the present example will be described in more detail.

Here, a case of using n measured images (n is a natural number) i-1 to i-n and m reference images (m is a natural number smaller than n) r-1 to r-m will be described.

Figure 4:
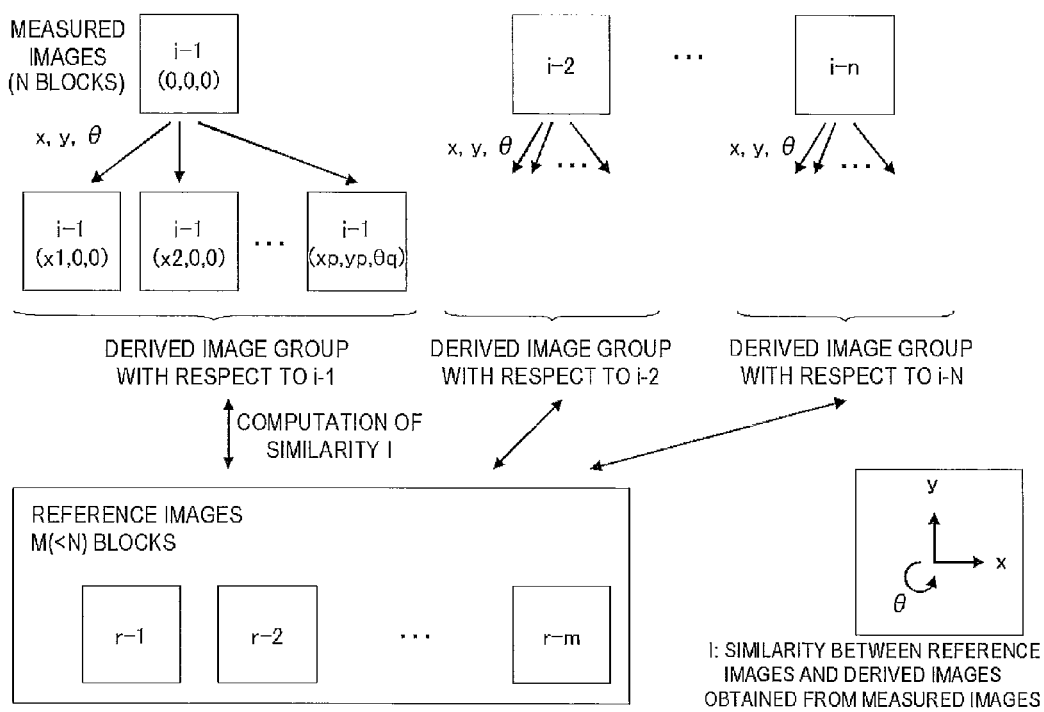
FIG. 4 is a view illustrating a schematic procedure for classifying measured images according to an embodiment.

FIG. 4 is a view illustrating a schematic procedure for classifying measured images.

In FIG. 4, a measured image which is highly similar is extracted while aligning a measured image and a reference image by evaluating similarity while changing relative positions of the measured image and the reference image. Similarity between a measured image and a reference image can then be reliably evaluated by appropriate alignment.

In this embodiment, translation images and rotation images obtained from the measured image are prepared as a derived image group for the measured image for alignment, and degree of similarity is evaluated for all combinations of the translation images and the rotation images. By evaluating similarity between the derived image group of each measured image and the reference image, similarity when changing a relative position of the measured image to the reference image is obtained, a derived image which is highly similar is searched for to extract a candidate image.

The derived image data generating unit 131 acquires data representing a measured image in the measured image data storage unit 121 from the measured image data acquiring unit 109, and generates data representing a derived image in which data representing a measured image is translated or rotated in a predetermined direction within a surface, for each measured image. At this time, the derived image data generating unit 131 generates data representing a derived image in which a measured image is translated at a predetermined pitch and rotated by a predetermined angle θ at a predetermined pitch within a surface for each of an x-axis direction and a y-axis direction referring to a computation expression stored in the condition storage unit 135, and relates the generated data with an identifier of a measured image and transmits the related data to the similarity computing unit 133. The data representing each derived image includes data in which an identifier of a measured image relates to movement in an x direction, a y direction and a θ direction. The derived image data generating unit 131 can store the generated data representing a plurality of derived images in a derived image data storage unit (not shown).

In FIG. 4, a measured image is translated in an x direction up to x1, x2, . . . , xp at a pitch Δx. The measured image is moved in a y direction up to y1, y2, . . . , yp at a pitch Δy. The measured image is moved in a θ direction up to θ1, θ2, . . . , θq at a pitch Δθ. Accordingly, i-1 (x1, 0, 0) to i-1 (xp, yp, θq) are obtained as derived images.

A derived image group of one measured image includes "(p+1)×(p+1)×(q+1)" derived images including an original measured image.

A rotation image group of a measured image generated as a derived image is a group of images obtained by rotating a measured image by zero (0) degrees to 360 degrees at a pitch of one degree. An image rotated by zero degrees corresponds to an original image which is not rotated. When storing data representing a rotation image in a derived image data storage unit (not shown) in advance, a rotation angle of a measured image is preferably within a range of at least zero (0) degrees to 90 degrees. If rotation data sets for zero (0) degrees to 90 degrees are generated in advance, an amount of data can be significantly reduced compared to when storing all of rotation images of up to 360 degrees in the derived image data storage unit. Also, when rotation data sets for zero (0) degrees to 90 degrees corresponding to four-fold symmetry are generated in advance, the data representing rotation images corresponding to zero degrees to 360 degrees which is necessary when evaluating similarity between derived images and reference images can be easily acquired by post-processing by inversing their sign with respect to an x-axis direction or a y-axis direction. A pitch angle of the rotation image is, for example, equal to or less than 5 degrees, and specifically one (1) degree. As a result, an evaluation accuracy of similarity between a derived image of a measured image and a reference image can be improved.

The similarity computing unit 133 refers to the condition storage unit 135 and acquires a similarity computation expression stored in the condition storage unit 135. The similarity computing unit 133 computes similarity between a derived image and a reference image using the acquired computation expression. For example, when the number of pixels of the derived image and the reference image is n×m (n and m are natural numbers), the similarity computing unit 133 computes a distance index of the derived image and the reference image in an n×m-dimensional image space as similarity. In the following description, a distance index is used as a correlation value.

When computing the correlation value, the data sets representing the reference image and the derived image are transformed into their respective vectors using, for example, a known method. At this time, with respect to an image stored as a data set representing an n×m matrix is transformed into a vector of an n×m length, a scalar product is performed between vector data representing the transformed reference image and vector data representing the transformed derived mage. When the S/N ratio of data representing the measured image is low, filtering using a known method can be performed before the scalar product can be performed.

Figure 5:
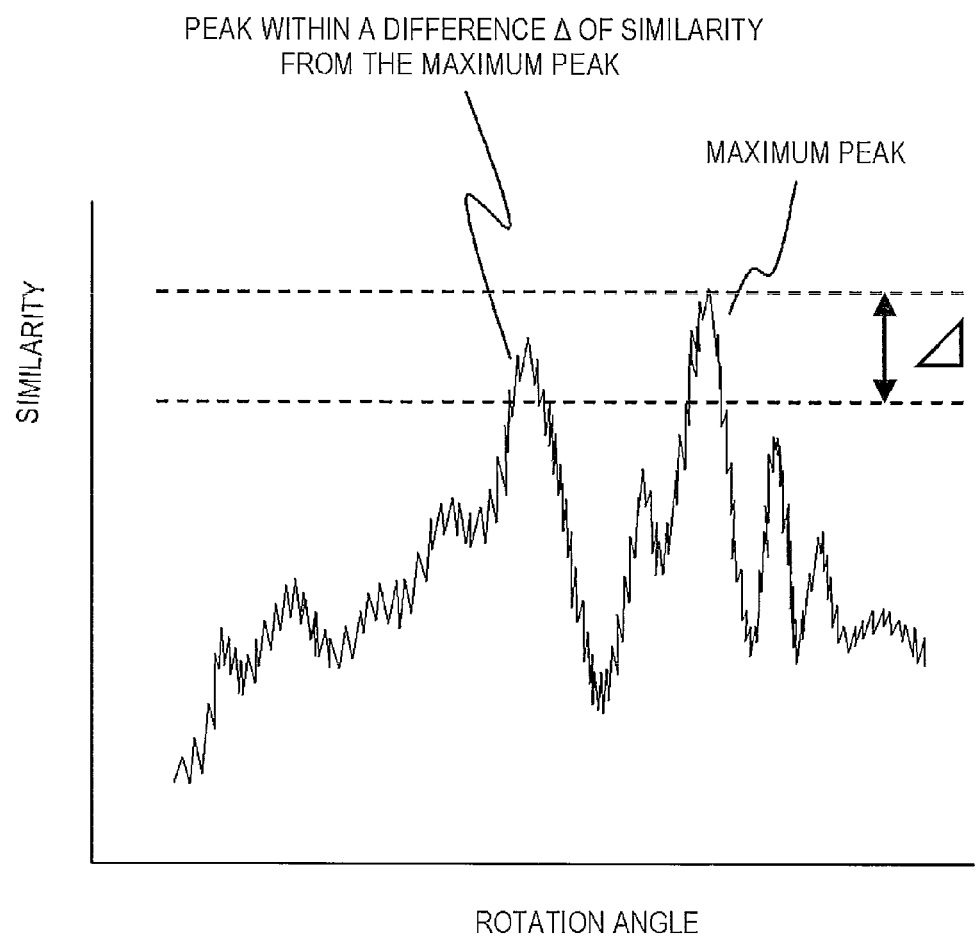
FIG. 5 is a view illustrating a method for classifying measured images according to an embodiment.

FIG. 5 is a graph illustrating a correlation value of a reference image and a derived image. In FIG. 5, a horizontal axis represents a rotation angle θ of a derived image which is derived from one measured image, and a vertical axis represents similarity between a measured image and a reference image, or specifically a correlation value.

FIG. 5 illustrates a relationship between a relative position of a θ direction and similarity of a derived image group of one measured image about one reference image. A number of data sets representative of FIG. 5 that is the number of the reference images is generated for each derived image group. Here, similarity is compared while aligning a measured image and a reference image by rotation, but a measured image and a reference image are actually aligned also about a relative position of a translation direction (two-dimensional part).

The similarity computing unit 133 computes similarity I for all combinations of a derived image and a reference image. Similarity I is correlated to an identifier of the measured image together with x, y and θ and is transmitted to the candidate searching unit 139.

The candidate searching unit 139 acquires similarity data computed by the similarity computing unit 133 and searches for a plurality of derived images which are highly similar to any reference image from one derived image group. Specifically, the candidate searching unit 139 considers a correlation value to search for a derived image in which a peak value of a correlation value, that is, a peak value of a vertical axis of FIG. 5, is a maximum peak and a derived image in which a peak value has a particular relationship from a maximum peak value as a derived image with high similarity. In FIG. 5, a derived image whose peak value is within a certain range Δ from a maximum peak value is searched for.

FIG. 6 is a view illustrating an evaluation result of similarity between a derived image group of a certain measured image and a plurality of reference images.

FIG. 6 illustrates a table in which a rotation angle of a derived image and similarity I correlate for a combination of a measured image i-1 and each reference image. In FIG. 6, three derived images are extracted as derived images which are highly similar to the reference image from a derived image group of the measured image i-1 as follows:

similarity I1 to a reference image r-1: rotation angle θ2,
similarity I2 to a reference image r-3: rotation angle θ3, and
similarity I3 to a reference image r-1: rotation angle θ5,
which are listed in a high similarity order. Here, for example, I1>I2>I3, and a difference between either of I2 and I3 and I1 is smaller than Δ.

Further, only a rotation angle is used, but actually a movement amount of a translation direction in which similarity becomes maximum is also extracted.

Also, a relationship between the S/N ratio of a measured image and a difference Δ can be stored in the condition storage unit 135, and the range Δ can be set by the candidate searching unit 139 based on the S/N ratio of a measured image referring to the relationship stored in the condition storage unit 135. By setting the difference Δ based on the S/N ratio, oversight of derived images which are estimated to be highly similar to a reference image can be more surely suppressed, and extraction of a noise peak can be suppressed. Accuracy of searching for a derived image can therefore be further increased.

Although not limited particularly, the candidate searching unit 139 may set the difference Δ relatively small when the S/N ratio of a measured image is large and relatively large when the S/N ratio is small.

The candidate searching unit 139 can set the range Δ of the peak difference based on the S/N ratio of a measured image and a data size of an image group obtained after image searching. In this case, a candidate peak can be more surely extracted, and data processing efficiency can be further improved.

The candidate searching unit 139 relates information of a positional misalignment amount and similarity for a measured image of a derived image extracted as an image which is highly similar to a reference image with an identifier of the measured image for storage in the search result storage unit 137 as the data representing the extracted derived image. Information of a positional misalignment amount is a translation amount (x and y) and a rotation (rotation angle θ) with a measured image, and similarity corresponds to a magnitude I of a peak illustrated in FIG. 5.

The candidate searching unit 139 may give different weighted parameters to extracted derived images according to a magnitude of similarity I. In this case, the data representing weighted parameters is stored in the condition storage unit 135, and the candidate searching unit 139 can acquire the data representing weighted parameters in the condition storage unit 135.

If weighted parameters are assigned to their corresponding data sets representing derived images, the averaging processing unit 115 may generate averaged images using values of the weighted parameters when performing averaging processing in step S107.

Next, averaging processing of step S107 according to this embodiment will be described in more detail.

Figure 7:
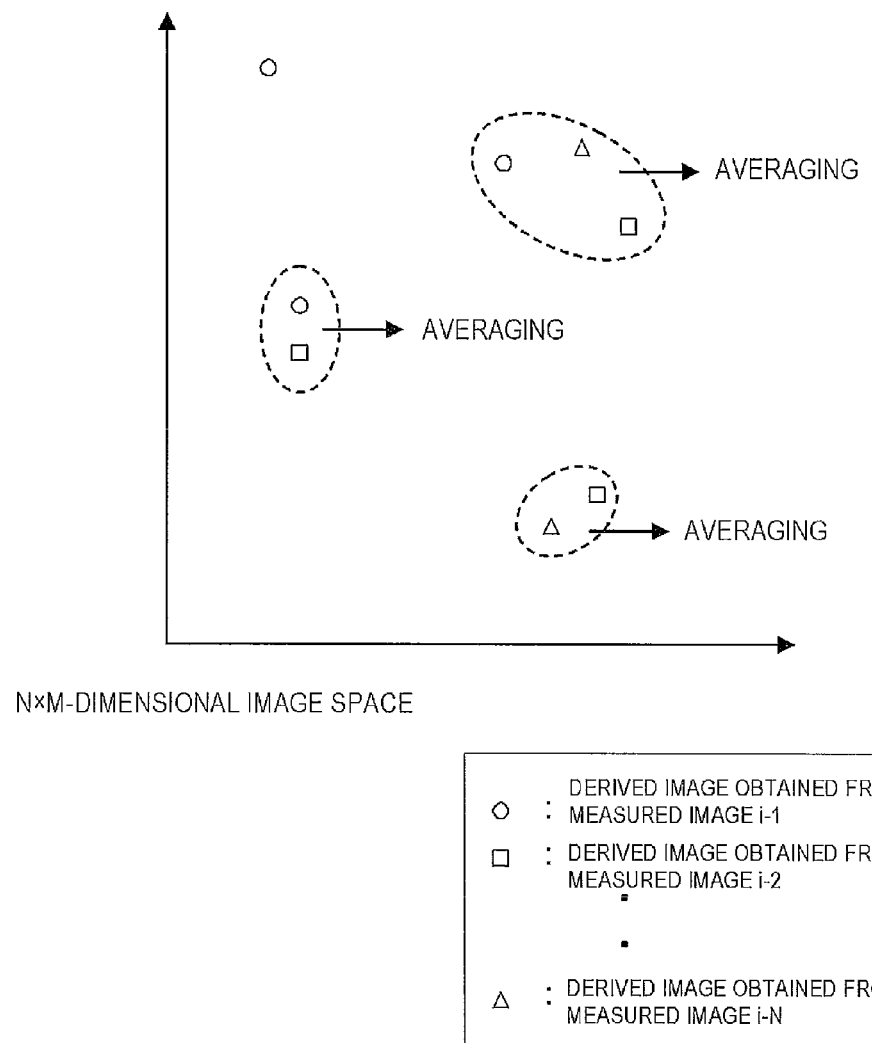
FIG. 7 is a view illustrating a method for classifying measured images according to an embodiment.

FIG. 7 is a view illustrating a spatial arrangement of derived images extracted in FIG. 6. In FIG. 7, for ease of description, derived images are two-dimensionally arranged, but actual derived images have n×m pixels, and if the number of derived images is L, derived images are arranged in an n×m-dimensional image space or an L-dimensional pixel space.

In step S107, the averaging processing unit 115 groups derived images obtained from each measured image based on the proximity in an n×m-dimensional image space or an L-dimensional pixel space referring to a parameter related to hierarchical classification which is stored in the average information storage unit 127. The averaging processing unit 115 can classify derived images into a predetermined number of groups, and can give group numbers as classification parameters to their corresponding data sets representing the classified derived images.

The averaging processing unit 115 averages a plurality of derived images which are classified into the same group and high in proximity to each other to generate an averaged image. At this time, the number of generated averaged images can be identical to or different from the number of reference images used in step S105. For example, when repeating the cycle including steps S103 to S111 twice or more, a relatively large number of averaged images can be generated in an initial cycle, and a relatively small number of averaged images can be generated in a cycle after the updating is repeated.

Next, working effects of this embodiment will be described.

In this embodiment, when classifying measured images in step S105, a plurality of derived images which are evaluated to be highly similar to a reference image are searched for from a derived image group obtained from one measured image, and an averaged image is generated using a plurality of derived images extracted. Therefore, compared to a method in which one measured image is associated with one reference image, the resolution of each averaged image obtained by averaging processing can be improved. Also, the reliability of a three-dimensional structure obtained when a three-dimensional structure is reconstructed using each averaged image as a projected image corresponding to a specific direction can be improved.

The above-described effects will be described in more detail with reference to FIG. 5.

First, in a case in which one measured image is associated with one reference image, for example, only derived images having a peak corresponding to a maximum peak of FIG. 5 are extracted and averaged.

However, when the S/N ratio of a measured image is small, there is a case in which a plurality of large peaks appears in FIG. 5. Also, there is a possibility that a maximum peak will be a noise peak. For this reason, in the method of using only a maximum peak, there is a case in which a "real peak" is not extracted. Also, while repeatedly generating an averaged image and performing the updating of reference images, the data representing a derived image corresponding to a "real peak" can be lost without being extracted. Therefore, even when repeatedly generating an averaged image and performing the updating of reference images, there is a limitation in improving the resolution of an averaged image, and so the resolution of more than a certain level could not be obtained.

If a derived image corresponding to a "real peak" is lost, a projected image of the membrane protein in a specific direction is lost. The loss of the projected image corresponding to the specific direction causes a spatially empty area when reconstructing a three-dimensional structure in step S113, leading to deterioration of the reliability of an obtained three-dimensional structure.

Particularly, in the case of molecules such as membrane proteins which are easy to orientate when preparing a sample used to capture a measured image, there is a case in which the distribution of original projection directions of measured images is localized or projected images corresponding to a specific direction is hard to be found. If a derived image corresponding to a "real peak" is lost about a measured image of a rare projection angle, oversight of a so-called "characteristic view" occurs, and thus a three-dimensional structure is not accurately reconstructed.

In this regard, in this embodiment, not only derived images corresponding to a maximum peak of FIG. 5 but also derived images corresponding to a peak which is within a certain range Δ from a maximum peak are extracted. Therefore, even when peak noise is large, oversight of a "real peak" does not occur, and the resolution of the averaged image obtained by one time classifying can be improved. Therefore, even in molecules such as membrane proteins which are easy to orientate, a "characteristic view" can be extracted without oversight, thereby improving the reliability of a three-dimensional structure.

In this embodiment, since the number of times that reference images are updated (S111 of FIG. 1) can be reduced, even if a time necessary to acquire an averaged image once becomes longer, a total processing time can be reduced.

As described above, according to this embodiment, even when noise of a measured image is large, a total processing time can be reduced, and the resolution of an averaged image and the reliability of a three-dimensional structure can be improved.

Also, even when the S/N ratio of a measured image is very small to the extent that it is difficult to extract a contour of a measured image with the conventional method, according to the present example, an averaged image with an improved S/N ratio can be obtained. Therefore, a contour of an averaged image can be extracted for the structure determination (S113 of FIG. 1).

In the case in which both the subject of analysis and any other subject are included in a measured image, if the S/N ratio of a measured image is small, it can be difficult to determine whether the measured image is an image of the subject of analysis. Even in this case, by obtaining an averaged image using the method of this embodiment, it is possible to discriminate an image of the subject of analysis from an image which is not a subject of analysis when performing the structure determination (S113 of FIG. 1).

The embodiments of the present invention have been described with reference to the accompanying drawings, but they are exemplary examples of the present invention and can employ various configurations.

For example, in the embodiments described above, a plurality of data processing units 101 can be installed in the structure determination system 100, and distribution processing through a plurality of data processing units 101 can be applied to search processing of a reference image of step S105. Also, a plurality of data processing units 101 can be installed, and distribution processing through the data processing units 101 can be applied to measurement of a translation image for each measured image and generation of a rotation image for each reference image. A large amount of data can therefore be processed rapidly and efficiently.

In the embodiments described above, a case of generating a derived image group in which a measured image is translated and rotated as a method for changing a relative position of a measured image and a reference image is described, but a method for changing a relative position is not limited to the method described above.

For example, the derived image data generating unit 131 may generate data representing a translated image formed by translating data representing a measured image for each of a plurality of measured images and generate data representing rotated images formed by rotating data representing reference images by a predetermined pitch (angle) for each reference image, and the similarity computing unit 133 may compute similarity for all the data.

In the examples described above, a second candidate derived image is searched for based on the difference Δ from a peak of a correlation value, but a search criterion of a candidate derived image is not limited to this. For example, a derived image can be searched for based on a peak in which a peak of a certain value of a measured image is largest and second largest. Also, the number of derived images extracted as a second candidate is not limited particularly, and one derived image can be extracted as a second candidate or two or more derived images which satisfy a condition can be extracted as a second candidate.

In the embodiments described above, a correlation value is used as an index of an inter-image distance between a derived image and a reference image in an n×m-dimension image space. However, an index representing a distance is not limited to a correlation value or to an index computed using a scalar product. For example, a predetermined weighted coefficient can be multiplied in computing a distance for each pixel.

In the embodiments described above, a case of searching up to a second candidate derived image has been described, but an n-th candidate derived image (n is a natural number equal to or more than 3) can be further searched for after searching for a second candidate derived image.

EXAMPLES

First, in an example 1 and a comparative example 1, image groups were generated by translating and rotating a certain original image and randomly providing noise. Using these image groups as measured images, an image was reconstructed using methods described below, and a correlation value for an original image was compared.

FIGS. 8(b) and 8(d) are views illustrating two original images from which a measured image and a reference image are generated. As shown in FIGS. 8(b) and 8(d), a pair of images which are reversed horizontally was used as two images. In FIGS. 8(b) and 8(d), a vertical axis and a horizontal axis represent a vertical coordinate and a horizontal coordinate (in both the figures, 0 to 255) of an image, respectively.

FIG. 8(a) illustrates a frequency (histogram) of a pixel value of FIG. 8(b), and FIG. 8(c) represents a frequency (histogram) of a pixel value of FIG. 8(d). In FIGS. 8(a) and 8(c), a horizontal axis represents a pixel value (0 to 256), and a vertical axis represents the frequency.

For each of FIGS. 8(b) and 8(d), 3,200 sample image groups were generated by rotating at every 360/8 degrees within a surface, randomly translating and randomly providing noise, and using the obtained image groups as measured images. The S/N ratio of a measured image was 0.01.

Figure 9:
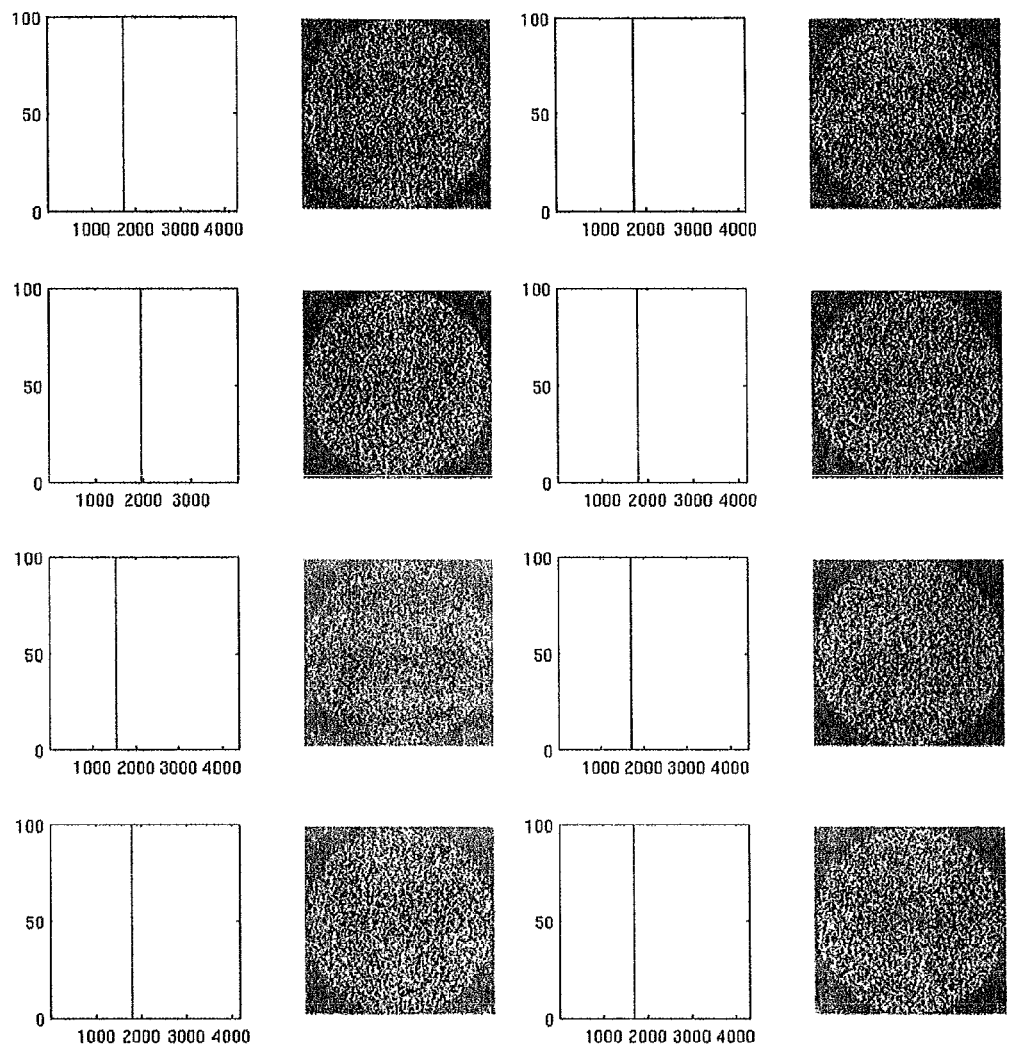
FIG. 9 illustrates images on which noise is superimposed.

FIG. 9 is a view illustrating 8 images of a measured image group. In FIG. 9, a horizontal axis and a vertical axis of each image represent a vertical coordinate and a horizontal coordinate (in both the figures, 0 to 255), respectively. A graph shown in the left side of each image is a histogram of a pixel value of a corresponding image, a horizontal axis represents a pixel value (0 to 256), and a vertical axis represents the frequency.

Also, two images in which images of FIGS. 8(b) and 8(d) are not translated and only noise is given are used as initial reference images.

Example 1

In the present example, image analysis was performed using MRMA (optimum image searching using a plurality of image peaks)/MSA (multi-distributed static analysis)/HAC (hierarchical classification) methods sequentially.

The entire three-dimensional parameter space was searched for using the above-described method according to the embodiment described above, and for each measured image, a correlation value was computed while changing a relative position of a measured image and a reference image, a reference image which has a maximum peak of a correlation value was extracted, and reference images which correspond to all peaks within 10% from a maximum peak of a correlation value were extracted. One or more derived images were generated from one measured image based on the extracted reference image and its relative position. In order to make the accuracy identical to that of the comparative example 1 which will be described later, hierarchical processing was performed until a value of a final increment of distribution becomes a value which corresponds to a final increment of distribution when performing hierarchical classification up to a class in which 8 derived images were obtained in the comparative example 1. Eight images having smaller distribution were extracted as averaged images from obtained images (>8 images).

Figure 10:
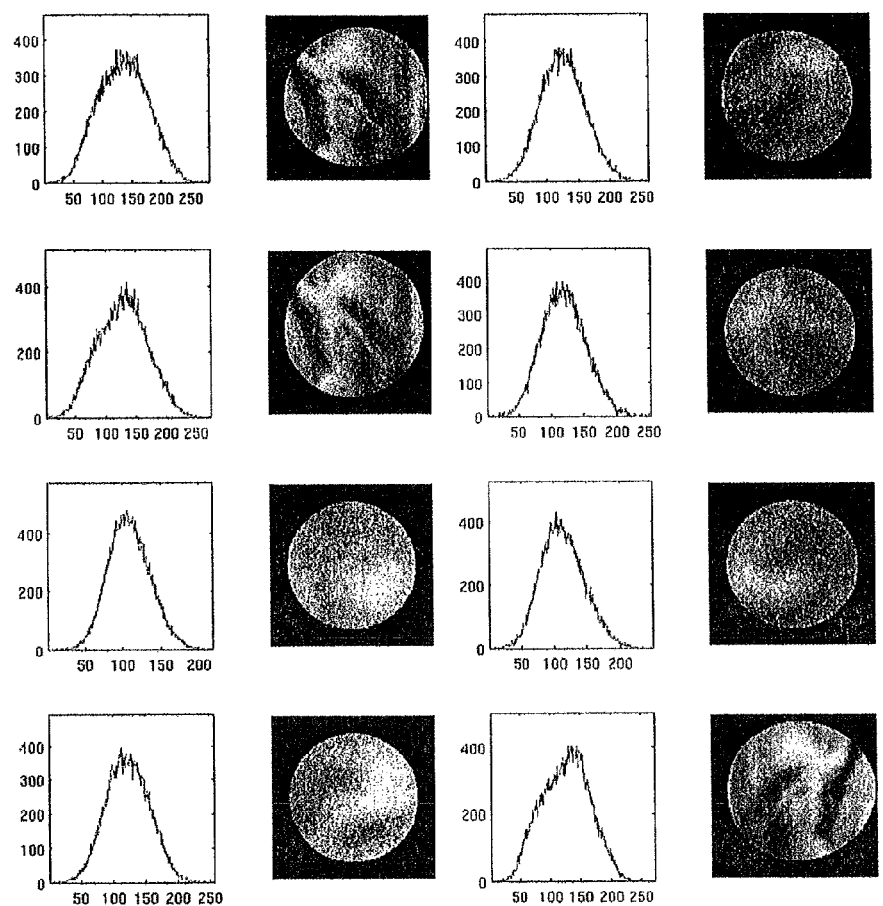
FIG. 10 illustrates images obtained by processing according to an example.

FIG. 10 is a view illustrating 8 averaged images obtained in the present example.

Similar image processing was performed by changing an S/N ratio of a measured image, and a correlation value of an original image and an averaged image was obtained.

Figure 12:
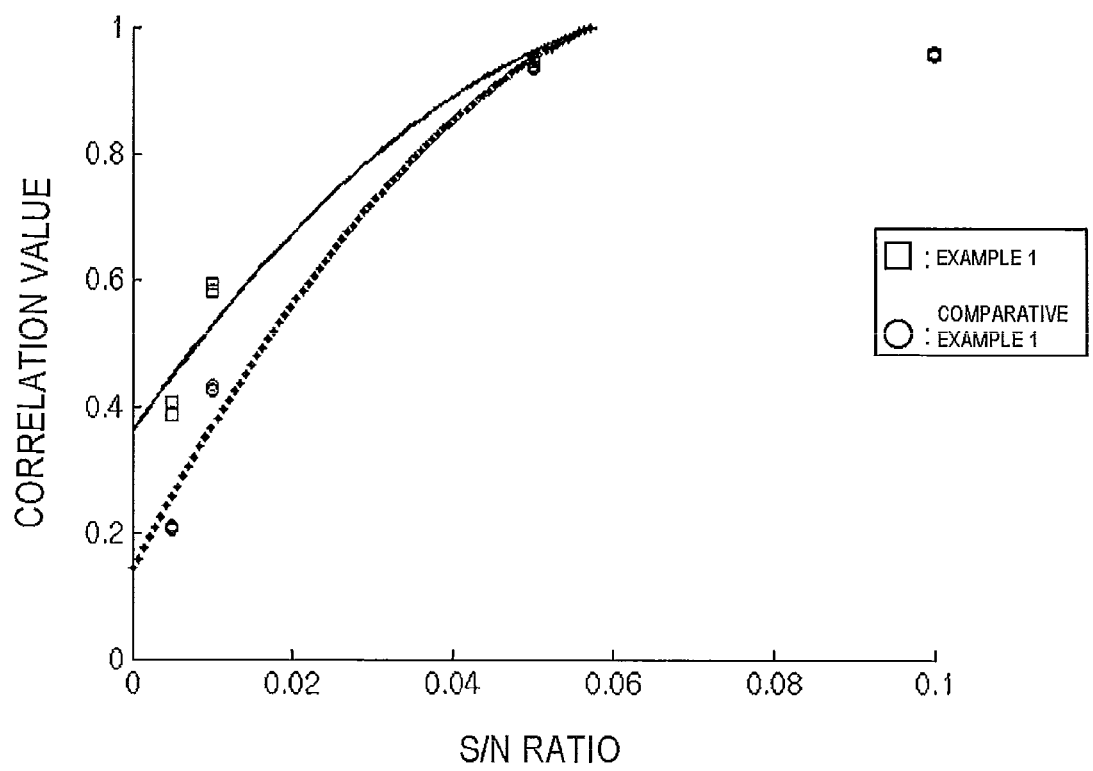
FIG. 12 is a view illustrating a correlation value between an original image and an image obtained by processing according to an example.

FIG. 12 is a view illustrating a relationship between an S/N ratio of a measured image and a correlation value between an original image and an averaged image about the example 1 and the comparative example 1 which will be described later. In FIG. 12, a solid line represents a line drawn by a least square method about a plot (□ in the drawing) of a correlation value in the present example.

Comparative Example 1

In the present comparative example, image analysis was performed using MRA (image location aligning method using a single peak)/MSA/HAC methods.

In the present comparative example, one measured image is associated with one reference image using an MRA with high accuracy instead of an MRMA used in the example 1. When associating a measured image with a reference image, the entire three-dimensional parameter space was searched, and one measured image was associated with only a reference image having the highest similarity. A correlation value was computed for each measured image while changing a relative position of a measured image and a reference image, a reference image having a maximum peak of a correlation value was extracted, and one derived image was generated from one measured image.

The subsequent processing was performed in a similar method to the example 1. In the HAC method, hierarchical processing was performed up to a class in which eight derived images were obtained.

Figure 11:
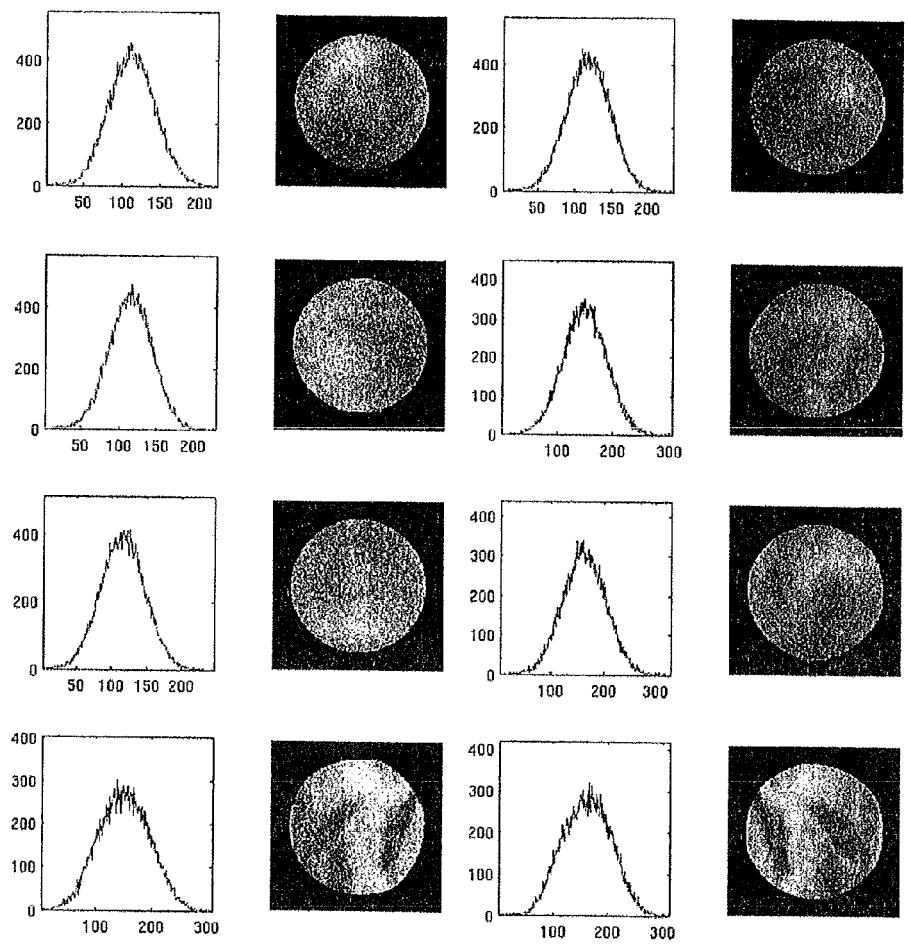
FIG. 11 illustrates images obtained by processing according to an example.

The result is shown in FIG. 11. FIG. 11 is a view illustrating eight averaged images obtained in the present comparative example.

In the present comparative example, similar image processing was performed by changing the S/N ratio of a measured image, and a correlation value between an original image and an averaged image was obtained. The result is shown in FIG. 12. The accuracy per cycle for each method can be understood from FIG. 12. In FIG. 12, a dotted line represents a line drawn by a least square method for a plot (o in the drawing) of a correlation value of the present comparative example.

When FIG. 10 and FIG. 11 are compared with each other, FIG. 10 has more images similar to an original image. As described above, since the resolution of a measured image can be improved at a cycle of one time by the method of the example 1, it is expected that the total number of cycles is reduced and the overall efficiency is improved. Also, it is expected that a final resolution is improved by the method of the example 1. As shown in FIG. 12, as the S/N ratio is reduced, a difference of a correlation value between the method of the example 1 and the method of the comparative example 1 becomes larger, and predominance of the MRMA is particularly observed.

FIG. 14 summarizes an average distribution and an S/N ratio of a generated image when an original image is generated from an image group generated by translating, rotating and providing noise to a certain original image using the methods of the example 1 and the comparative example 1. The images of FIGS. 8(b) and 8(d) were used as original images, and for each of cases in which an S/N ratio is 0.005, 0.01, 0.05, and 0.10, statistically equivalent image groups (a) to (c) were generated. For each of the image groups (a) to (c) of each S/N ratio, processing was performed by the methods according to the example 1 and the comparative example 1.

It can be understood from FIG. 14 that images obtained by the example 1 are smaller in distribution and higher in accuracy than images obtained by the comparative example 1. It can also be understood that the example 1 is a method for generating an averaged image of higher accuracy when an S/N ratio of an image group before processing is small.

Next, processing of a measured image of protein was performed according to an example 2 and a comparative example 2. Specifically, image analysis was performed using MRMA/MSA/HAC methods (example 2) and MRA/MSA/HAC methods (comparative example 2) about a measured image of Transient receptor protein 3 (TRP3 protein) and a measured image of a voltage dependent Na+ channel image.

Example 2

Figure 16:
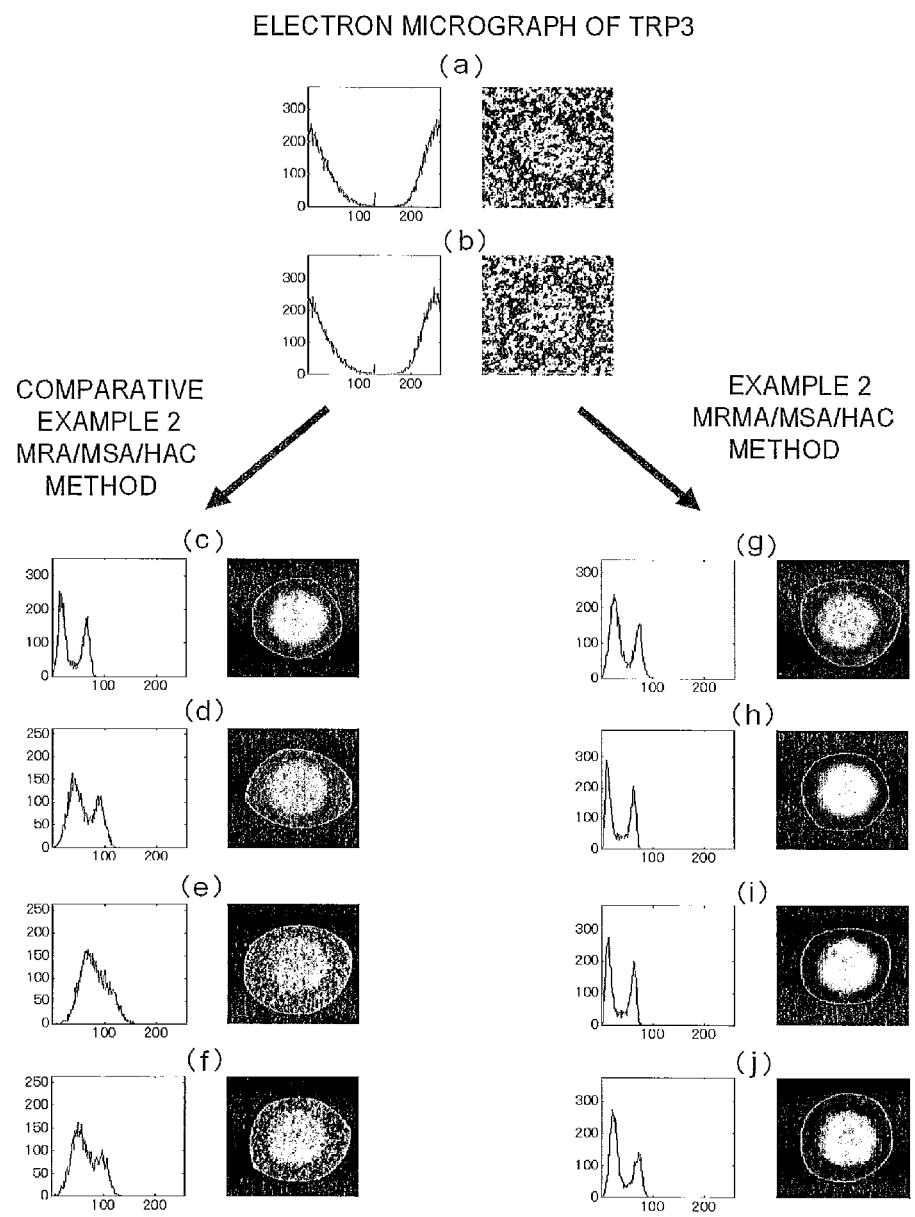
FIG. 16 illustrates images obtained by processing according to an example.
Figure 17:
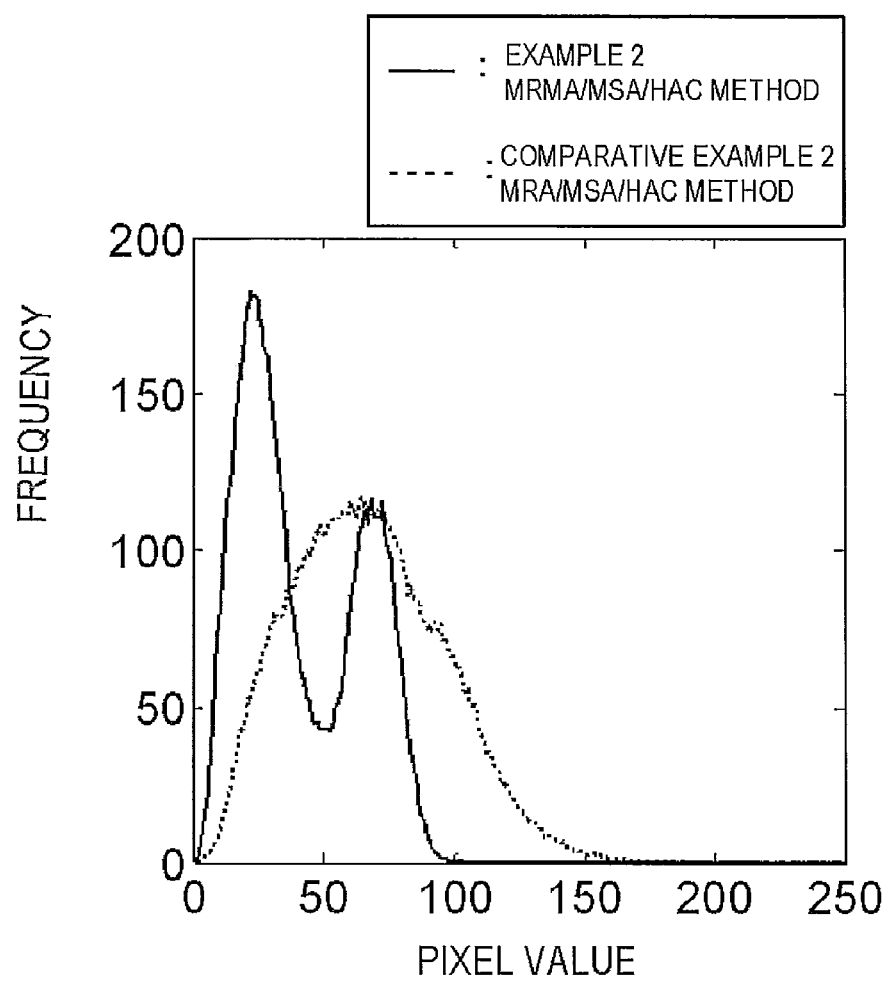
FIG. 17 is a view illustrating processing results according to an example.

In the present example, about TRP3 protein, the entire three-dimensional parameter space was searched according to the method of the example 1 using 2,967 measured images (the number of pixels: 140×140), and about each measured image, a correlation value was computed while changing a relative position of a measured image and a reference image, a reference image which has a maximum peak of a correlation value was extracted, and reference images which correspond to all peaks within 10% from a maximum peak of a correlation value were extracted. The output number of reference images was 10,197. One or more derived images were generated from one measured image based on the extracted reference image and its relative position. Hierarchical processing was performed until a value of a final increment of distribution becomes a value which corresponds to a final increment of distribution when performing hierarchical classification up to a class in which 30 derived images were obtained in the comparative example 2. Thirty images having smaller distribution were extracted as averaged images from obtained images (>30 images). The result is shown in FIGS. 15 to 17.

About a voltage dependent Na+ channel, each processing was performed according to the method for TRP3 protein using 11,991 measured images (the number of pixels: 80×80). The output number of reference images was 35,415. Hierarchical processing was performed until a value of a final increment of distribution becomes a value which corresponds to a final increment of distribution when performing hierarchical classification up to a class in which 120 derived images were obtained in the comparative example 2. One-hundred and twenty images having smaller distribution were extracted as averaged images from obtained images (>120 images) in an order in which distribution is small. The result is shown in FIG. 15.

Comparative Example 2

In this comparative example, image analysis was performed using MRA/MSA/HAC methods according to the comparative example 1 for a measured image of each protein used in the example 2. In the HAC method, hierarchical processing was performed up to a class in which 30 derived images were obtained for TRP3 protein. Hierarchical processing was performed up to a class in which 120 derived images were obtained for a voltage dependent Na$^+$ channel. The result is shown in FIGS. 15 to 17.

FIG. 15 is a view illustrating an average distribution of images generated according to the example 2 and the comparative example 2.

As can be seen from FIG. 15, the method of the example 2 enabled image analysis with higher accuracy than the method of the comparative example 2 for both an averaged image generated from a measured image of TRP3 protein and an averaged image generated from a measured image of a voltage dependent Na+ channel.

FIG. 16 is a view illustrating a measured image, an imaged generated in the example 2, and an image generated in the comparative example 2 for TRP 3 protein.

FIGS. 16(a) and 16(b) illustrate examples of electron micrographs (measured images) of TRP3 protein, FIGS. 16(c) to 16(f) illustrate examples of generated images obtained according to the comparative example 2, and FIGS. 16(g) to 16(j) illustrate examples of generated images obtained according to the example 2. In FIGS. 16(a) to 16(j), graphs shown in the left side of each image illustrate histograms of a pixel value of a corresponding image, a horizontal axis represents a pixel value (0 to 256), and a vertical axis represents frequency. FIGS. 16(c) to 16(f) and FIGS. 16(g) to 16(j) selectively illustrate typical images and do not relate to a frequency within an averaged image group of each feature image.

As can be seen from FIGS. 16(a) to 16 (j), in the MRMA/MSA/HAC methods of the example 2, a structure of TRP3 can be clearly recognized in all of FIGS. 16(g) to 16(j).

Meanwhile, in the MRA/MSA/HAC methods of the comparative example 2, an image of a level equal to FIGS. 16(g) to 16(j) is only FIG. 16(c). In FIGS. 16(d) to 16(f), since a lot of noise is included, a structure cannot be clearly recognized. Even in a numerical value, FIGS. 16(g) to 16(j) and 16(c) are identical in histogram shape and thus have a shape corresponding to a structure, but FIGS. 16(d) to 16(f) have different shapes from that shape.

FIG. 17 is a view illustrating a histogram in which histograms of images within an averaged image group generated according to the example 2 and the comparative example 2 are averaged.

As can be seen from FIG. 17, images (solid line) according to the MRMA/MSA/HAC methods of the example 2 have the same shape as FIGS. 16(g) to 16(j), and most images within an averaged image group are clear images like FIGS. 16(g) and 16(j).

On the other hand, images (dotted line) according to the MRA/MSA/HAC methods of the comparative example 2 have the same shape as FIG. 16(e) or 16(f), and images in which a structure cannot be clearly recognized occupy most of images within an averaged image group.

It can be understood from FIGS. 15 to 17 that the MRMA/MSA/HAC methods can generate a clearer averaged image than the MRA/MSA/HAC methods even in case of using a measured image of an actual bio-molecule.

The invention claimed is:

1. A structure determination system which classifies data representing a plurality of measured images relating to a certain subject of analysis into a plurality of images and determines a structure of said subject of analysis based on the classification result, said structure determination system comprising:

a reference image data storage unit which stores data representing a plurality of reference images;

a measured image classifying unit which generates data representing a plurality of groups of derived images being derived from said measured images by changing a relative position of each of said measured images with respect to said reference images, evaluates similarity between said derived images and said reference images for each of said plurality of groups of derived images, and extracts, from each of said groups of derived images, a plurality of derived images highly similar to any one of said plurality of reference images;

an averaged image data generating unit which classifies said plurality of derived images extracted by said measured image classifying unit into a plurality of groups, averages the derived images classified into a common group to generate data representing a plurality of averaged images, and determines whether updating of data representing said reference images is necessary, said averaged image data generating unit performing the updating of data representing said plurality of reference images in said reference image data storage unit using data representing said plurality of averaged images and sends a request causing said measured image classifying unit to perform processing for extracting said derived images when determining that the updating is necessary, and said averaged image data generating unit setting the generated data representing a plurality of averaged images as data to be used for structure determination when determining that the updating is not necessary; and a structure determining unit which acquires data representing said plurality of averaged images generated by said averaged image data generating unit and determines a structure of said subject of analysis based on the acquired data.

2. The structure determination system of claim 1, wherein signal to noise ratios of said measured images are equal to or less than 0.1.

3. The structure determination system of claim 1, wherein:
the number of pixels of said each derived image is n×m (where n and m are natural numbers); the number of said derived images is L (where L is a natural number); and
said averaged image data generating unit classifies said plurality of derived images based on positional proximity among said plurality of derived images in an n×m-dimensional image space or an L-dimensional pixel space.

4. The structure determination system of claim 1, wherein:
said averaged image data generating unit updates data representing said plurality of reference images in said reference image data storage unit using data representing said plurality of averaged images and sends a request causing said measured image classifying unit to perform processing for extracting the derived images;
said measured image classifying unit receives said request, evaluates similarity between said derived images and the updated reference images, and extracts, from each of said groups of derived images, a plurality of derived images highly similar to any one of the updated reference images;
said averaged image data generating unit classifies said plurality of derived images newly extracted by said measured image classifying unit into a plurality of groups, averages the newly extracted derived images classified into a common group to update data representing said plurality of averaged images, and determines whether updating of data representing said reference images is necessary, wherein, when determining that the updating is necessary, said averaged image data generating unit updates data representing said plurality of reference images in said reference image data storage unit using data representing said plurality of averaged images again and sends a request causing said measured image classifying unit to perform processing for extracting the derived images, and when determining that the updating is not necessary, said averaged image data generating unit sets the generated data representing said plurality of averaged images as data to be used for structure determination; and said structure determining unit acquires data representing said plurality of averaged images generated by said averaged image data generating unit and determines a structure of said subject of analysis based on the acquired data.

5. The structure determination system of claim 1, wherein: the number of pixels of each of said derived images and said reference images is n×m (where n and m are natural numbers); and said measured image classifying unit searches for said derived images on the basis of indexes which represent respective distances between said derived images and said reference images in an n×m-dimensional image space.

6. The structure determination system of claim 5, wherein said measured image classifying unit searches for said plurality of derived images highly similar to any one of said plurality of reference images, as a derived image which corresponds to a maximum peak of the indexes representing said distances from among each of said groups of derived images, and as one or more derived images each corresponding to a difference Δ of a peak of the indexes representing said distances from among each of said groups of derived images, said difference Δ being within a certain range.

7. The structure determination system of claim 6, wherein said difference Δ is set based on signal-to-noise ratios of said measured images.

8. The structure determination system of claim 5, wherein said indexes representing the distances are correlation values between said derived images and said reference images.

9. The structure determination system of claim 1, wherein: said subject of analysis is a molecule; and said structure determining unit acquires data representing said plurality of averaged images generated by said averaged image data generating unit, and determines a structure of said molecule based on the acquired data and by using said averaged images as projected images obtained by projecting said molecule in specific directions.

10. The structure determination system of claim 9, wherein said molecule is a biological macromolecule.

11. The structure determination system of claim 10, wherein said biopolymer is a membrane protein.

12. A structure determination system which classifies a plurality of measured images relating to a membrane protein into a plurality of images and determines a structure of said membrane protein based on the classification result, said structure determination system comprising:

a reference image data storage unit which stores data representing a plurality of reference images;

a measured image classifying unit which generates data representing a plurality of groups of derived images being derived from said measured images by changing a relative position of each of said measured images with respect to said reference images, evaluates similarity between said derived images and said reference images for each of said plurality of groups of derived images, and extracts, from each of said groups of derived images, a plurality of derived images highly similar to any one of said plurality of reference images;

an averaged image data generating unit which classifies said plurality of derived images extracted by said measured image classifying unit into a plurality of groups, averages the derived images classified into a common group to generate data representing a plurality of averaged images, and determines whether updating of data representing said reference images is to be performed, said averaged image data generating unit performing the updating of data representing said plurality of reference images in said reference image data storage unit using data representing said plurality of averaged images and sending a request causing said measured image classifying unit to perform processing for extracting said derived images when determining that the updating is necessary, and said averaged image data generating unit setting the generated data representing a plurality of averaged images as data to be used for structure determination when determining that the updating is not necessary; and a structure determining unit which acquires data representing said plurality of averaged images generated by said averaged image data generating unit and determines a structure of said subject of analysis based on the acquired data, wherein:

the number of pixels of each of said derived images and said reference images is n×m (where n and m are natural numbers);

on the basis of indexes which represent respective distances between said derived images and said reference images in an n×m-dimensional image space, said measured image classifying unit is configured to search for a derived image which corresponds to a maximum peak of the indexes, as one of said plurality of derived images which is most similar to any one of said plurality of reference images, and for one or more derived images each corresponding to a difference Δ of a peak of the indexes representing said distances, said difference Δ being within a certain range;

said averaged image data generating unit classifies said plurality of derived images based on positional proximity among said plurality of derived images in an n×m-dimensional image space or an L-dimensional pixel space, and further updates data representing said plurality of reference images in said reference image data storage unit using data representing said plurality of averaged images and sends a request causing said measured image classifying unit to perform processing for extracting the derived images;

said measured image classifying unit receives said request, evaluates similarity between said derived images and the updated reference images, and extracts, from each of said groups of derived images, a plurality of derived images highly similar to any one of the updated reference images;

said averaged image data generating unit classifies said plurality of derived images newly extracted by said measured image classifying unit into a plurality of groups on the basis of positional proximity among said plurality of derived images in said L-dimensional pixel space, averages the newly extracted derived images classified into a common group to update data representing said plurality of averaged images, and determines whether updating of data representing said reference images is necessary, wherein, when determining that the updating is necessary, said averaged image data generating unit updates data representing said plurality of reference images in said reference image data storage unit using data representing said plurality of averaged images again and sends a request causing said measured image classifying unit to perform processing for extracting the derived images, and when determining that the updating is not necessary, said averaged image data generating unit provides the generated data representing said plurality of averaged images to said structure determining unit; and said structure determining unit acquires data representing said plurality of averaged images generated by said averaged image data generating unit and determines a structure of said membrane protein based on the acquired data.

13. A structure determination method for classifying data representing a plurality of measured images relating to a certain subject of analysis into a plurality of images and for determining a structure of said subject of analysis based on the classification result, said method comprising the steps of:

generating data representing a plurality of groups of derived images being derived from said measured images by changing a relative position of each of said measured images with respect to said reference images, evaluating similarity between said derived images and said reference images for each of said plurality of groups of derived images, and extracting, from each of said groups of derived images, a plurality of derived images highly similar to any one of said plurality of reference images;

classifying said plurality of derived images extracted in said step of extracting a plurality of derived images into a plurality of groups, averaging the derived images classified into a common group to generate data representing a plurality of averaged images;

determining whether updating of data representing said reference images is necessary;

when it is determined in said step of determining that the updating is necessary, performing the updating of data representing said plurality of reference images using new data representing said plurality of averaged images, and performing the preceding steps starting from said step of generating data representing a plurality of groups of derived images again; and when it is determined that the updating is not necessary, determining said structure of said subject of analysis based on data representing said plurality of averaged images.

14. A non-transitory computer readable medium storing a program which causes a computer to function as a structure determination system which classifies data representing a plurality of measured images relating to a certain subject of analysis into a plurality of images and determines a structure of said subject of analysis based on the classification result, said structure determination system comprising:

a reference image data storage unit which stores data representing a plurality of reference images;

a measured image classifying unit which generates data representing a plurality of groups of derived images being derived from said measured images by changing a relative position of each of said measured images with respect to said reference images, evaluates similarity between said derived images and said reference images for each of said plurality of groups of derived images, and extracts, from each of said groups of derived images, a plurality of derived images highly similar to any one of said plurality of reference images;

an averaged image data generating unit which classifies said plurality of derived images extracted by said measured image classifying unit into a plurality of groups, averages the derived images classified into a common group to generate data representing a plurality of averaged images, and determines whether updating of data representing said reference images is necessary, said averaged image data generating unit performing the updating of data representing said plurality of reference images in said reference image data storage unit using data representing said plurality of averaged images and sending a request causing said measured image classifying unit to perform processing for extracting said derived images when determining that the updating is necessary, and said averaged image data generating unit setting the generated data representing a plurality of averaged images as data to be used for structure determination when determining that the updating is not necessary; and a structure determining unit which acquires data representing said plurality of averaged images generated by said averaged image data generating unit and determines a structure of said subject of analysis based on the acquired data.

15. The structure determination system claim 3, wherein:

said averaged image data generating unit updates data representing said plurality of reference images in said reference image data storage unit using data representing said plurality of averaged images and sends a request causing said measured image classifying unit to perform processing for extracting the derived images;

said measured image classifying unit receives said request, evaluates similarity between said derived images and the updated reference images, and extracts, from each of said groups of derived images, a plurality of derived images highly similar to any one of the updated reference images;

said averaged image data generating unit classifies said plurality of derived images newly extracted by said measured image classifying unit into a plurality of groups, averages the newly extracted derived images classified into a common group to update data representing said plurality of averaged images, and determines whether updating of data representing said reference images is necessary, wherein, when determining that the updating is necessary, said averaged image data generating unit updates data representing said plurality of reference images in said reference image data storage unit using data representing said plurality of averaged images again and sends a request causing said measured image classifying unit to perform processing for extracting the derived images, and when determining that the updating is not necessary, said averaged image data generating unit sets the generated data representing said plurality of averaged images as data to be used for structure determination; and said structure determining unit acquires data representing said plurality of averaged images generated by said averaged image data generating unit and determines a structure of said subject of analysis based on the acquired data.

16. The structure determination system of claim 5, wherein:

said averaged image data generating unit updates data representing said plurality of reference images in said reference image data storage unit using data representing said plurality of averaged images and sends a request causing said measured image classifying unit to perform processing for extracting the derived images;

said measured image classifying unit receives said request, evaluates similarity between said derived images and the updated reference images, and extracts, from each of said groups of derived images, a plurality of derived images highly similar to any one of the updated reference images;

said averaged image data generating unit classifies said plurality of derived images newly extracted by said measured image classifying unit into a plurality of groups, averages the newly extracted derived images classified into a common group to update data representing said plurality of averaged images, and determines whether updating of data representing said reference images is necessary, wherein, when determining that the updating is necessary, said averaged image data generating unit updates data representing said plurality of reference images in said reference image data storage unit using data representing said plurality of averaged images again and sends a request causing said measured image classifying unit to perform processing for extracting the derived images, and when determining that the updating is not necessary, said averaged image data generating unit sets the generated data representing said plurality of averaged images as data to be used for structure determination; and said structure determining unit acquires data representing said plurality of averaged images generated by said averaged image data generating unit and determines a structure of said subject of analysis based on the acquired data.

17. The structure determination system of claim 6, wherein:

said averaged image data generating unit updates data representing said plurality of reference images in said reference image data storage unit using data representing said plurality of averaged images and sends a request causing said measured image classifying unit to perform processing for extracting the derived images;

said measured image classifying unit receives said request, evaluates similarity between said derived images and the updated reference images, and extracts, from each of said groups of derived images, a plurality of derived images highly similar to any one of the updated reference images;

said averaged image data generating unit classifies said plurality of derived images newly extracted by said measured image classifying unit into a plurality of groups, averages the newly extracted derived images classified into a common group to update data representing said plurality of averaged images, and determines whether updating of data representing said reference images is necessary, wherein, when determining that the updating is necessary, said averaged image data generating unit updates data representing said plurality of reference images in said reference image data storage unit using data representing said plurality of averaged images again and sends a request causing said measured image classifying unit to perform processing for extracting the derived images, and when determining that the updating is not necessary, said averaged image data generating unit sets the generated data representing said plurality of averaged images as data to be used for structure determination; and said structure determining unit acquires data representing said plurality of averaged images generated by said averaged image data generating unit and determines a structure of said subject of analysis based on the acquired data.

18. The structure determination system of claim 9, wherein:

said averaged image data generating unit updates data representing said plurality of reference images in said reference image data storage unit using data representing said plurality of averaged images and sends a request causing said measured image classifying unit to perform processing for extracting the derived images;

said measured image classifying unit receives said request, evaluates similarity between said derived images and the updated reference images, and extracts, from each of said groups of derived images, a plurality of derived images highly similar to any one of the updated reference images;

said averaged image data generating unit classifies said plurality of derived images newly extracted by said measured image classifying unit into a plurality of groups, averages the newly extracted derived images classified into a common group to update data representing said plurality of averaged images, and determines whether updating of data representing said reference images is necessary, wherein, when determining that the updating is necessary, said averaged image data generating unit updates data representing said plurality of reference images in said reference image data storage unit using data representing said plurality of averaged images again and sends a request causing said measured image classifying unit to perform processing for extracting the derived images, and when determining that the updating is not necessary, said averaged image data generating unit sets the generated data representing said plurality of averaged images as data to be used for structure determination; and said structure determining unit acquires data representing said plurality of averaged images generated by said averaged image data generating unit and determines a structure of said subject of analysis based on the acquired data.

* * * * *